United States Patent
Watanabe

(10) Patent No.: US 7,127,581 B2
(45) Date of Patent: Oct. 24, 2006

(54) DATA-MIGRATION METHOD

(75) Inventor: Naoki Watanabe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 10/791,734

(22) Filed: Mar. 4, 2004

(65) Prior Publication Data

US 2005/0154849 A1 Jul. 14, 2005

(30) Foreign Application Priority Data

Jan. 13, 2004 (JP) .............................. 2004-005635

(51) Int. Cl.
*G06F 12/02* (2006.01)

(52) U.S. Cl. .................. 711/165; 711/112; 711/150; 714/7

(58) Field of Classification Search ............. None
See application file for complete search history.

(56) References Cited

U.S. PATENT DOCUMENTS

| 5,680,640 | A | | 10/1997 | Ofek et al. |
| 6,044,444 | A | * | 3/2000 | Ofek ............ 711/162 |
| 6,356,977 | B1 | | 3/2002 | Ofek et al. |
| 6,374,327 | B1 | | 4/2002 | Sakaki et al. |
| 6,502,205 | B1 | * | 12/2002 | Yanai et al. ........... 714/7 |
| 6,598,174 | B1 | | 7/2003 | Parks et al. |
| 6,640,291 | B1 | | 10/2003 | Fujibayashi et al. |
| 2001/0011324 | A1 | | 8/2001 | Sakaki et al. |
| 2003/0110237 | A1 | | 6/2003 | Kitamura et al. |
| 2003/0145169 | A1 | | 7/2003 | Nagasawa et al. |
| 2003/0182525 | A1 | | 9/2003 | O'Connell et al. |
| 2004/0068629 | A1 | | 4/2004 | Fujibayashi et al. |
| 2004/0143832 | A1 | | 7/2004 | Yamamoto et al. |
| 2004/0158652 | A1 | | 8/2004 | Obara |

OTHER PUBLICATIONS

Implementing ESS Copy Services on S/390, Blunden et al, IBM P 502 8. 5 DASD migration.
EMC proposed Symmetrix Data Migration Services (EMC Corporation), http://japan.emc.com/pdf/products/sdms/sdms_ds.pdf.

\* cited by examiner

Primary Examiner—Mano Padmanabhan
Assistant Examiner—Patrick M Moore
(74) Attorney, Agent, or Firm—Mattingly, Stanger, Malur & Brundidge, P.C.

(57) ABSTRACT

A method of migrating data from an old storage subsystem to a new storage subsystem in a data processing system which comprises host computers and storage subsystems. There is provided a route-changing phase before the data is migrated from the old storage subsystem to the new storage subsystem. In the route-changing phase, each host computer can access both the old and new storage subsystems and the new storage subsystem writes data into the old storage subsystem in response to a write request from the host computer and reads data from the old storage subsystem and sends the data to the host computer in response to a read request from the host computer.

13 Claims, 19 Drawing Sheets

FIG.5

| # | migration status | old storage subsystem | | new storage subsystem | | |
|---|---|---|---|---|---|---|
|   |   | read | write | read | | write |
| 1 | before route change | old storage subsystem | old storage subsystem | inaccessible | | |
| 2 | route-changing phase | old storage subsystem | old storage subsystem | old→new | | new→old |
| 3 | data-migration phase | inaccessible | inaccessible | data-unmigrated area: old→new  data migrated area: new | | new storage subsystem |
| 4 | after data migration | inaccessible | inaccessible | new storage subsystem | | new storage subsystem |

FIG.6

| Gr.ID | Status | old storage subsystem ID | new storage subsystem ID | detail |
|---|---|---|---|---|
| G00 | transferred | S00-0000<br>S00-0001 | S08-0000<br>S08-0001 | /home<br>/usr |
| G01 | data transferring | S01-0000<br>S01-0001<br>S01-0002<br>S01-0003 | S09-0000<br>S09-0001<br>S09-0002<br>S09-0003 | /DBTable<br>/log<br>/backup0<br>/backup1 |
| G02 | route changing | S02-0000<br>S02-0001<br>S02-0002<br>S02-0003 | S09-0004<br>S09-0005<br>S09-0006<br>S09-0007 | /dept0<br>/dept1<br>/dept2<br>/dept5 |
| G03 | untransferred | S02-0004<br>S02-0005 | S09-0008<br>S09-0009 | /test0<br>/test1 |

601 602 603 604 605 — 114

FIG.9
(a) route-changing phase
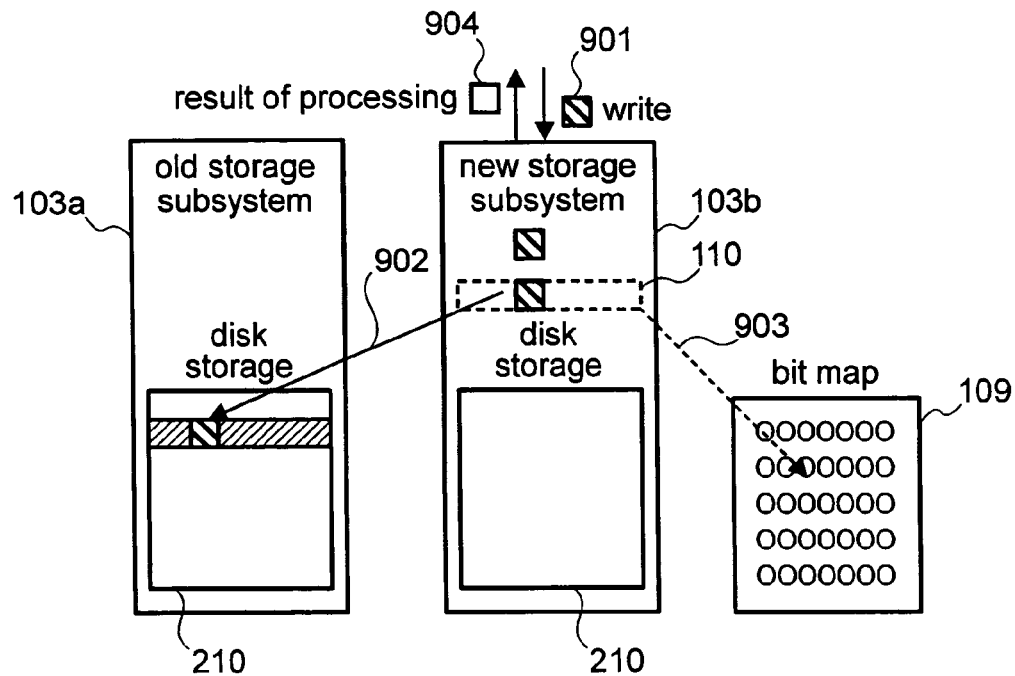
(b) data-migration phase (processing to data-unmigrated area)
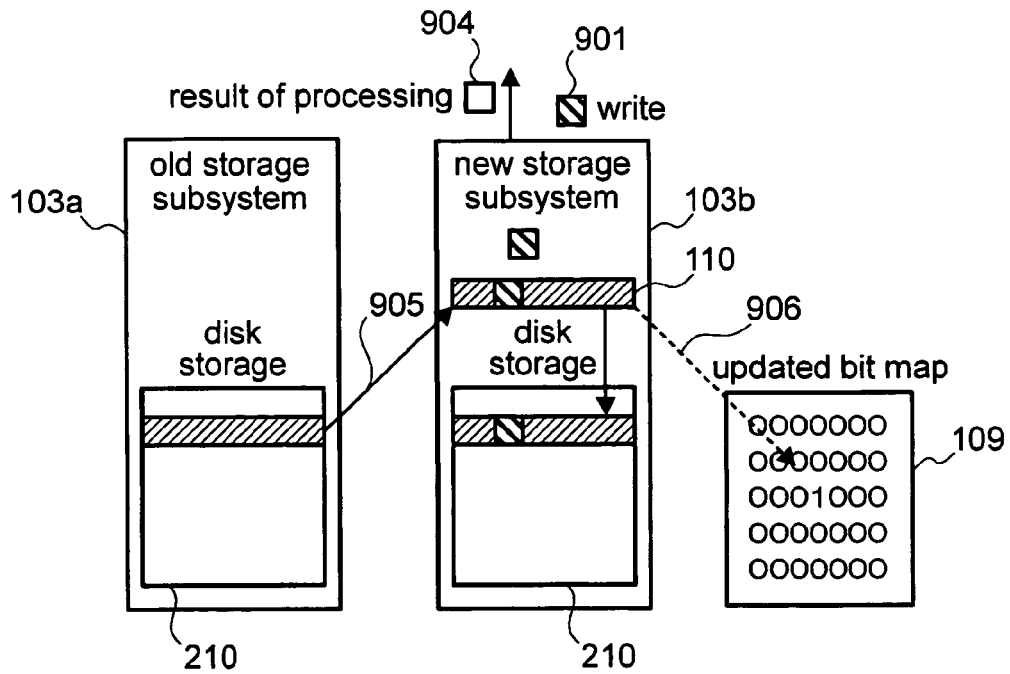

FIG.11
(a) route-changing phase
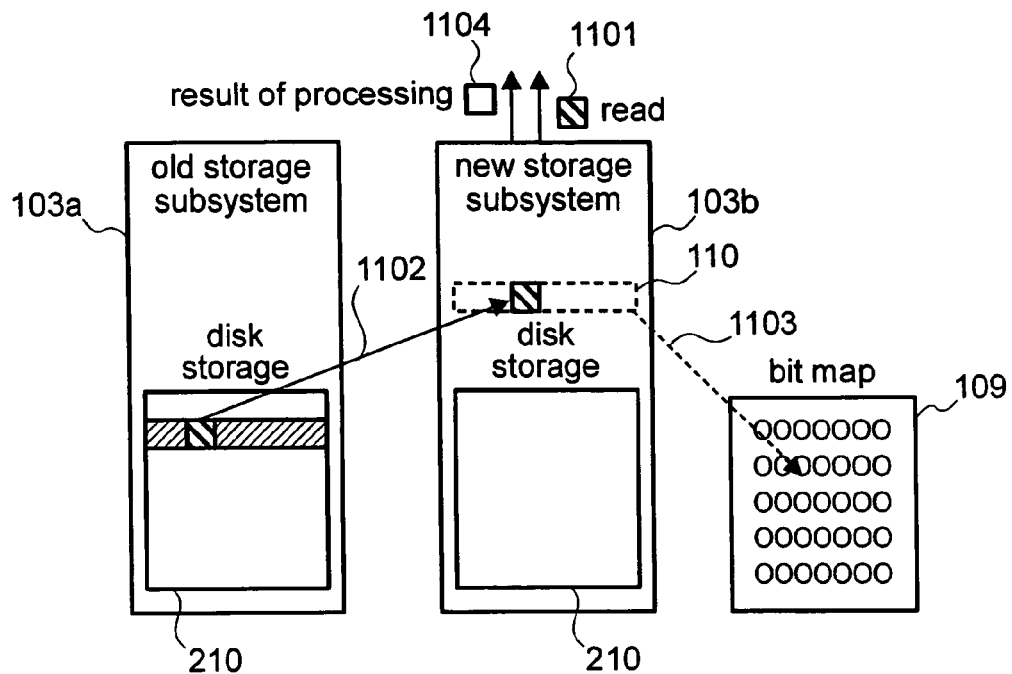
(b) data-migration phase (processing to data-unmigrated area)
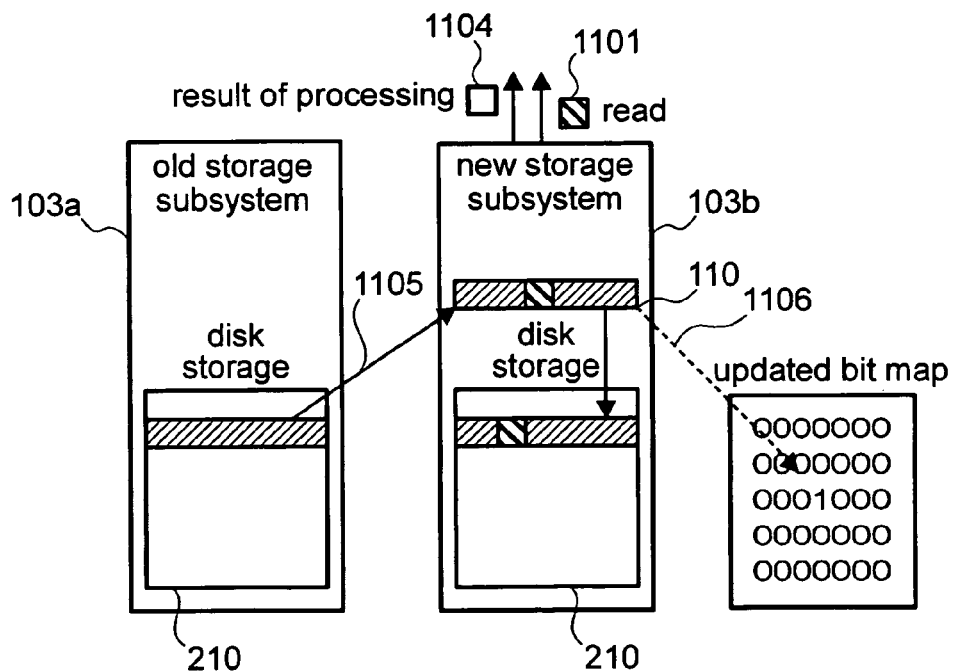

FIG.19

| # | migration status | old storage subsystem | | new storage subsystem | | |
|---|---|---|---|---|---|---|
| | | read | write | read | write | |
| 1 | before route change | old storage subsystem | old storage subsystem | inaccessible | inaccessible | |
| 2 | debugging mode | inaccessible | inaccessible | not updated: old→new updated: new | new storage subsystem | |
| 3 | data-migration phase | inaccessible | inaccessible | data-unmigrated area: old→new data-migrated area: new | new storage subsystem | |
| 4 | after data migration | inaccessible | inaccessible | new storage subsystem | new storage subsystem | |

DATA-MIGRATION METHOD

BACKGROUND OF THE INVENTION

This invention relates to a method of migrating data from a storage subsystem to another in a computer system. More specifically, this invention relates to a method of connecting a number of storage subsystems and migrating data from old storage subsystems to new ones without affecting a plurality of host computers.

IBM proposed Extended Remote Copy (XRC) and Peer-to-Peer Remote Copy (PPRC) to migrate data which are stored in a storage system and which a host computer is accessing (*Implementing ESS Copy Services on S/390*, IBM P. 502. 8. 5 DASD migration).

EMC proposed Symmetrix Data Migration Services (SDMS) (*Symmetrix Data Migration Services*, EMC Corporation, http://japan.emc.com/pdf/products/sdms/sdms_d-s.pdf).

SUMMARY OF THE INVENTION

When data are to be migrated from an old storage subsystem to a new storage subsystem in a data processing system according to the above prior art, all the host computers involved in the data migration have to be stopped before the data are migrated. If the data processing system is large and complex, data migration takes a long time, reducing the availability of the system.

The object of the present invention is to provide a method of migrating data in a data processing system without reducing the availability of the system even if the system is large and complex.

According to the present invention, there is provided a method of migrating data from an old storage subsystem to a new one in a data processing system which comprises host computers and storage subsystems. There is provided a route-changing phase before the data-migration phase. In the route-changing phase, each host computer can access both the old and new storage subsystems and the new storage subsystem writes data into the old storage subsystem in response to a write request from a host computer and reads data from the old storage subsystem and sends the data to the host computer in response to a read request from a host computer.

According to the present invention, the availability of a data processing system can be kept high if data migration takes place between storage subsystems in the system.

BRIEF DESCRIPTION OF THE DRAWINGS

The present invention can be appreciated by the description which follows in conjunction with the following figures, wherein:

FIG. 5 is a table of workings of old and new storage subsystems in each phase of data-migration processing of the data processing system of FIG. 1;

FIG. 6 is an example of a migration-control table of the data processing system of FIG. 1;

FIG. 9 is an illustration of data-writing processing in the route-changing phase and the data-migration phase of the data processing system of FIG. 1;

FIG. 11 is an illustration of data-reading processing in the route-changing phase and the data-migration phase of the data processing system of FIG. 1;

FIG. 19 is an illustration of the data-migration processing of FIG. 18.

DESCRIPTION OF THE SPECIFIC EMBODIMENTS

Figure 1:
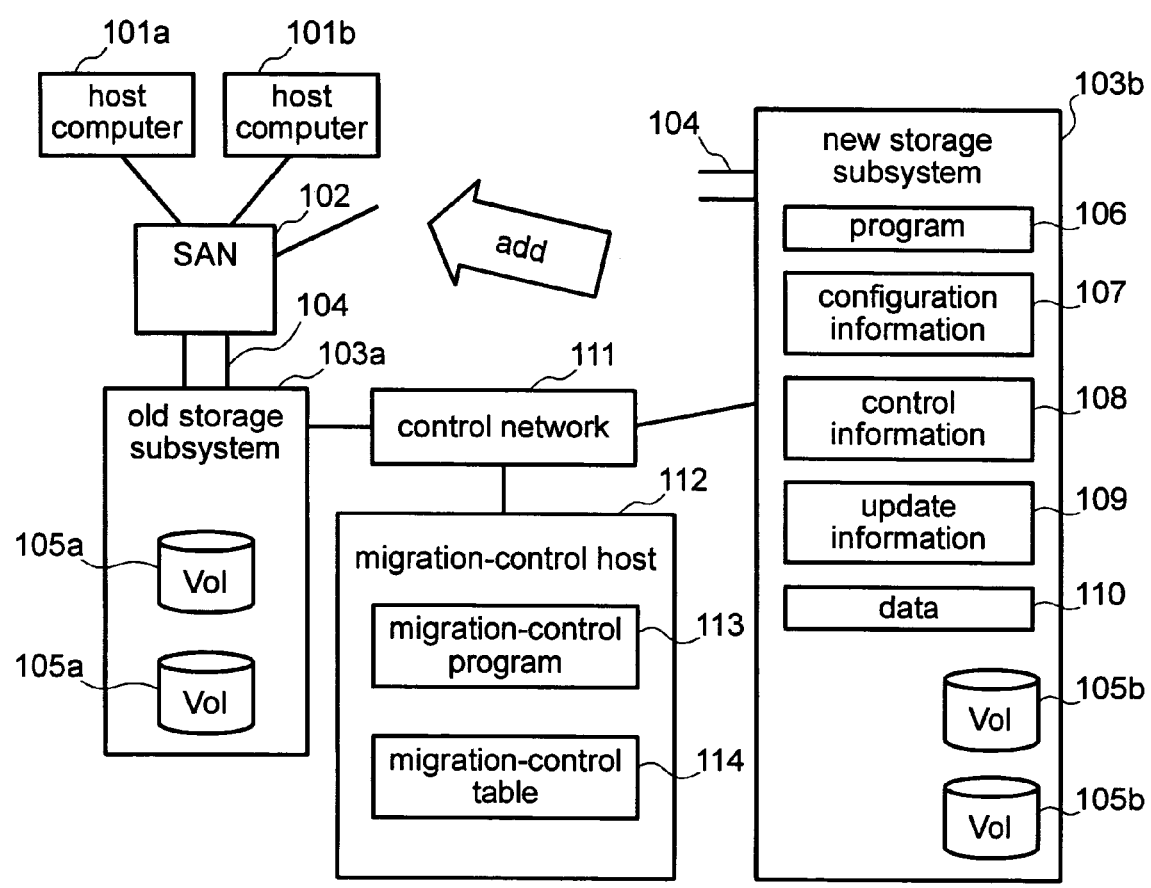
FIG. 1 is a schematic block diagram of an embodiment of data processing system according to the present invention.

Referring to the drawing, embodiments of the present invention will be described below.

FIG. 1 is a schematic block diagram of an embodiment of data processing system according to the present invention.

The data processing system comprises host computers 101a and 101b, an old storage subsystem 103a, and a new storage subsystem 103b. The storage subsystem 103 has a controller 201 to send and receive data to and from the host computers 101a and 101b and one or more disk storage 210 to store data. Although the storage subsystems 103a and 103b of this embodiment are disk-array devices, they may be of other types.

The number of each of the host computer 101, the old storage subsystem 103a, and the new storage subsystem 103b may be one or more.

Data are to be migrated from the old storage subsystem 103a to the new storage subsystem 103b. The old and new storage subsystems 103a and 103b are distinguished from each other by the reference letters "a" and "b", but the reference letters will be omitted if it is unnecessary to distinguish between them.

The host computers 110a and 101b are work stations, microcomputers, mainframes, or the like wherein application programs are running or database systems are operating.

Each storage subsystem 103 has one or more interfaces 104 and is connected to the host computers 101a and 101b through a storage area network (SAN) 102. The storage subsystems 103 may be connected directly without the SAN 102 to the host computers 101a and 101b. The interface 104 is of a fibre channel, but it may be an interface for the storage subsystem as a SCSI (Small Computer System Interface), iSCSI (internet SCSI), FICON, ESCON, or the like. No restriction is put on the structure of the SAN 102 or the kind of interfaces 104. As an example of the interfaces 104, in the present embodiment, the fibre channel interface will be described.

Each storage subsystem 103 has one or more logical volumes 105. The host computers 101a and 101b access the logical volumes 105 through the interfaces 104 to read and write data from and in them. At this time, the protocol for storage subsystems provided by each interface 104 is used. FCP (Fibre Channel Protocol for SCSI) is used for fibre channel interfaces. FC-SB (Single Byte Protocol) is used for FICON. No restriction in particular is put on the kinds of protocols used in the data processing system of the present invention.

The new storage subsystem 103b has a data-migration program 106 necessary for data migration, configuration information 107, control information 108, update information 109, and data 110.

The data-migration program 106 executes data-migration processing. The configuration information 107 and the control information 108 are information about the configuration and control of the storage subsystem 103, and the data-migration program 106 refers to the information to execute data-migration processing. Included in the control information 108 is a progress pointer which indicates the progress of data-migration processing and is used by the data-migration program 106.

The update information 109 is update information about write requests which the storage subsystem 103b receives from host computers 101 during data-migration processing. The update information 109 can be in the format of a bit map or the like to be described later. The storage subsystem 103b is provided with a cache memory to store temporarily data 110 about a read or write request from a host computer 101. The cache memory raises the speed of ordinary data input/output processing and executes data processing at the time of data-migration processing (905 of FIG. 9 and 1105 of FIG. 11, etc.).

The data-migration program 106 uses a progress pointer and a bit map for each logical volume 105 and executes data-migration processing for theoretical volumes 105 one by one.

A data-migration program 106 is installed in a storage medium of each storage subsystem 103 from a device by using portable storage media such as a compact disk or an optical magnetic disk, or through the medium of a control network 111.

A migration-control host 112 is provided, which is a workstation, personal computer, mainframe, or the like and has a CPU, a memory, and a storage. A migration-control program 113 runs in the CPU to control the migration of data from the old storage subsystem 103a to the new one 103b. A migration-control table 114 is held in the memory (or the storage).

The migration-control program 113 uses the migration-control table 114 to monitor and control data-migration processing. To be concrete, the migration-control program 113 monitors the conditions of storage subsystems 103, which are connected to the migration-control host 112 through the control network 111, and implements the change of configuration, data-migration processing, etc. A control network 111 is generally configured of Ethernet (registered trademark) using the Internet Protocol, but it may be of any type.

The migration-control program 113 sends the whole or a part of the migration-control table 114 to the data-migration program 106 of the new storage subsystem 103b. Based on the whole or the part of the migration-control table 114 thus sent from the migration control program 113, the data-migration program 106 prepares the configuration information 107 and the control information 108.

Although the migration-control host 112 is provided separately from the host computers 101 and the storage subsystems 102, the migration-control program 113 and the migration-control table 114 may be installed in any device in the system execute data-migration processing.

Figure 2:
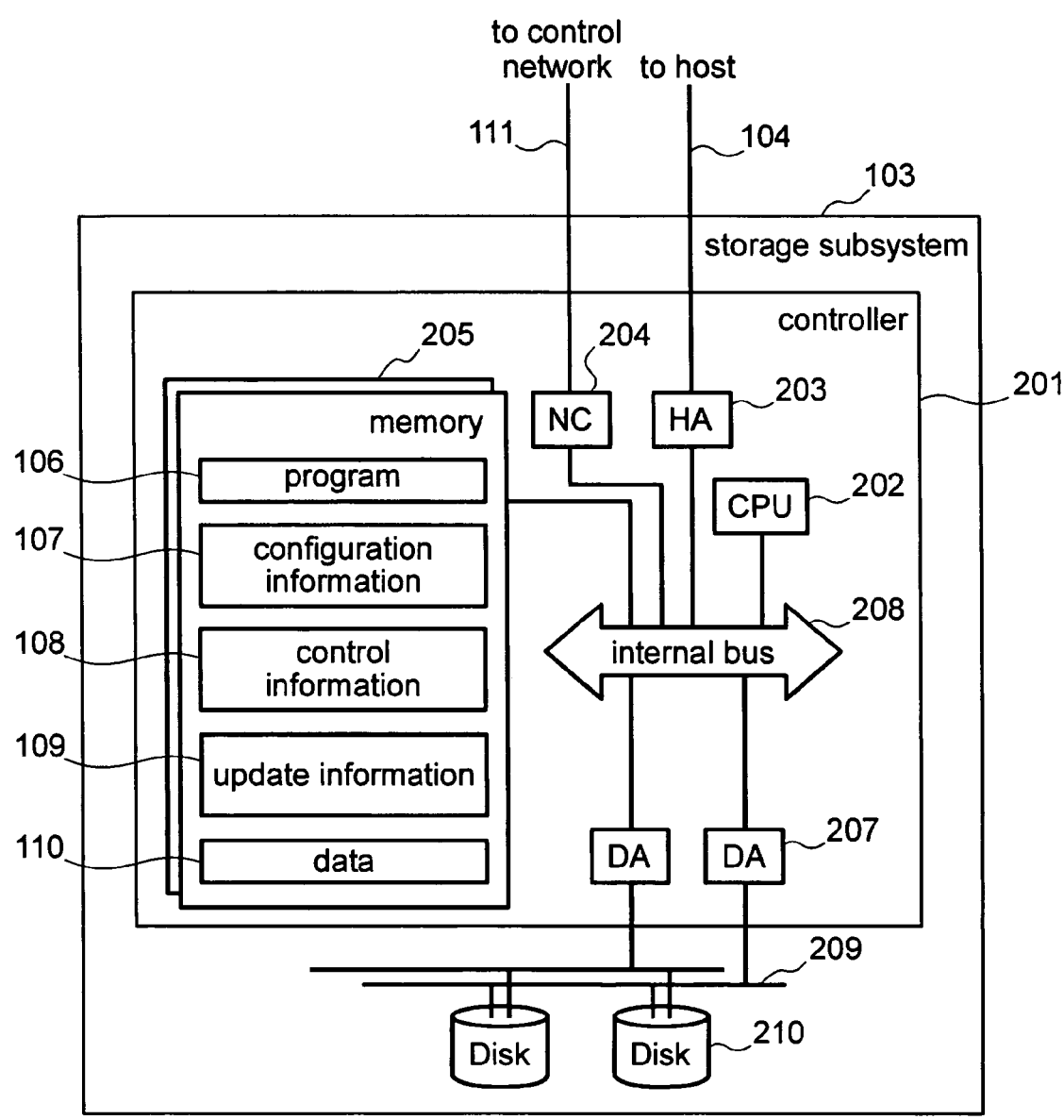
FIG. 2 shows a configuration of a storage subsystem of the data processing system of FIG. 1.

FIG. 2 shows the configuration of a storage subsystem 103.

The storage subsystem 104 has a controller 201 and one or more disk storages 210. The controller 201 has a host adapter 203, a memory 205, one or more disk adapters 207, a processor (CPU) 202, and a network controller 204. Although the number of each component is irrelevant to the substance of the present invention, multiplexing is preferable from the viewpoint of performance and reliability. The host adapter 203 controls the protocol for the interfaces 104 such as fibre channels.

The network controller 204 controls the protocol for the control network 111 and implements communication with the migration-control host 112.

Stored in the memory 205 are a program and data for data-migration processing. To put it concretely, stored in the memory 205 are the data-migration program 106, configuration information 107, control information 108, update information 109, and data 110 to accomplish data migration. Also stored in the memory 205 are a control program and control information for the control of storage subsystems 103 and cache data 110 for input and output processing to and from the host computers 101. It is preferable to provide mirrored memories 205 and dualpower supplies for the memories 205 to raise reliability.

In the same way as the host adapter 203, the disk adapters 207 process the protocol for a disk interface or interfaces 209 such as fibre channels or the like.

The disk storage or storages 210 receive commands to read and write from the controller 201 through the disk interface or interfaces 209 and implement the processing prescribed by the commands. It is preferable to provide each disk storage 210 with dual disk interfaces 209 to raise reliability.

Each storage subsystem 103 has a redundant structure wherein two or more disk storages 210 are combined and logical devices (logical volumes) 105 are formed. The processor (CPU) 202 executes the processing for the storage subsystems 103. The processor 202 is connected through an internal bus 208 to the host adapter 203, disk adapters 207, and network controller 204 inside the controller 201, and the processor 202 controls the host and disk adapters 203 and 207 and the network controller 204. The processor 202 is also connected to the memory 205 through the internal bus 208, loads the data-migration program 106 and the control information 108 stored in the memory 205 into itself, and implements the data-migration program 106. The old storage subsystem 103a has the configuration of FIG. 2, in the same way as the new storage subsystem 103b. However, the old storage subsystem 103a will do if it has functions to send and receive data to and from the host computers 101.

Although the storage subsystem 103 of the present embodiment has been described by adopting a simple internal structure, no restriction is put on the internal structure so long as the storage subsystem 103 has equal functions. For example, switches may be use instead of the internal bus 208 to accomplish communication among components of the controller 201 as disclosed in Japanese Unexamined Patent Publication No. 10-333836.

Figure 3:
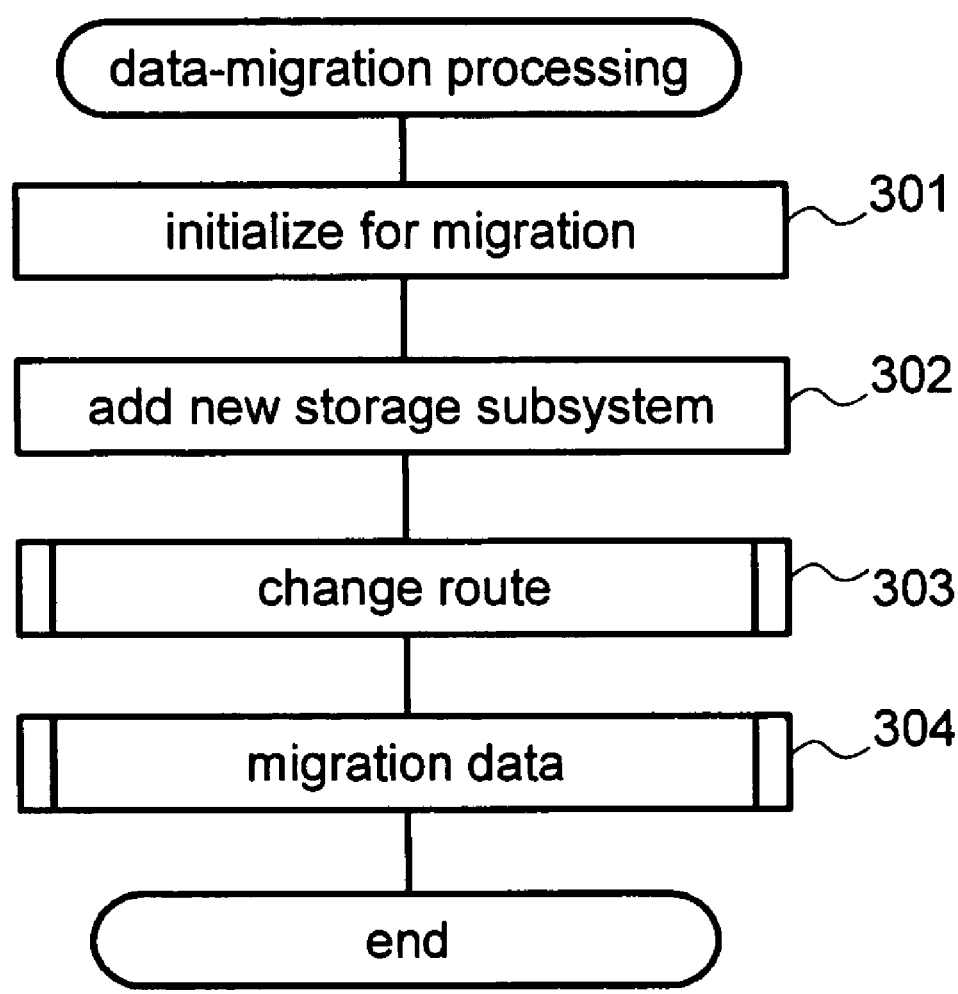
FIG. 3 is a flowchart of the data-migration processing of the data processing system of FIG. 1.
Figure 4:
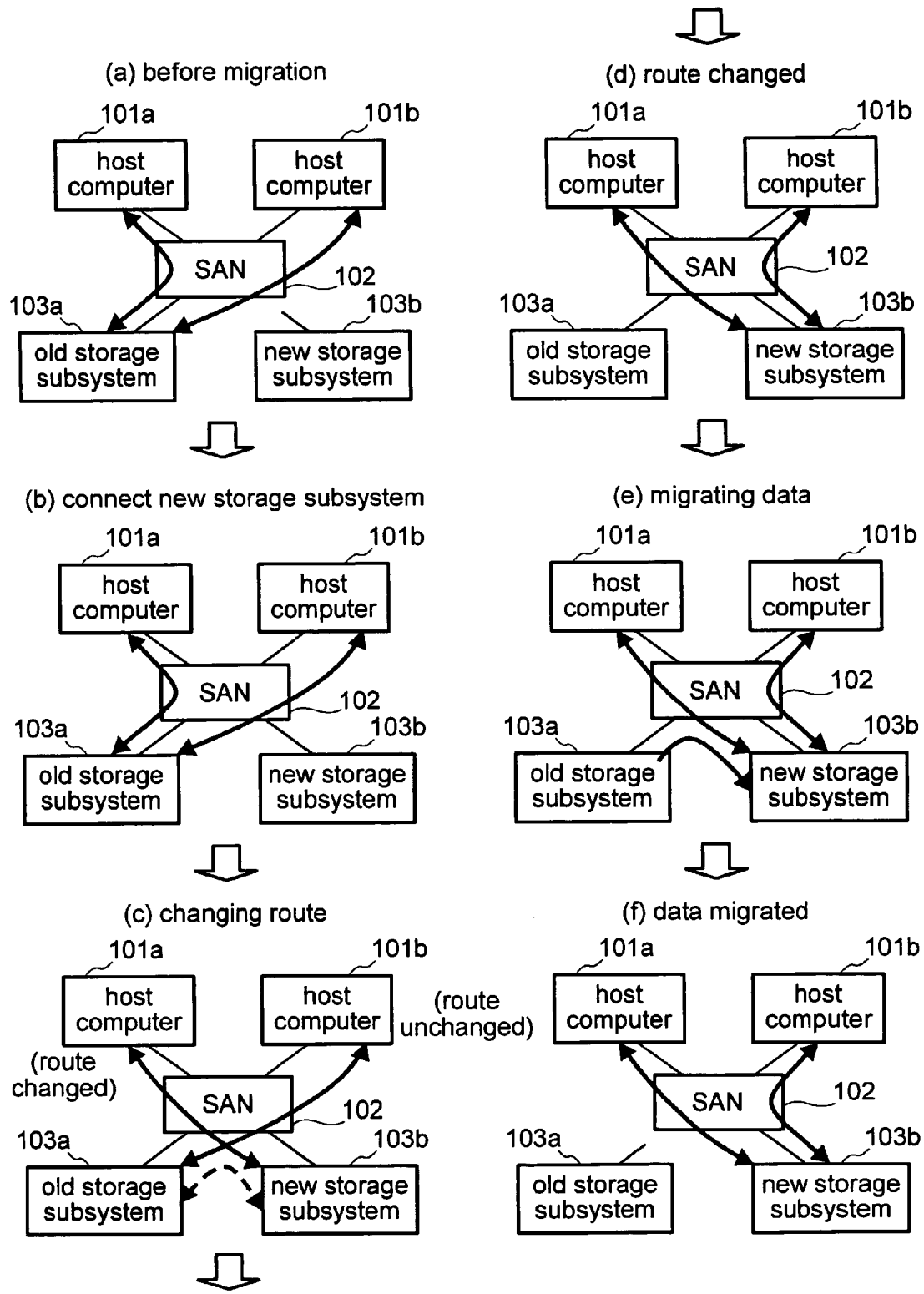
FIG. 4 is an illustration of the workings of the data processing system of FIG. 1.

FIG. 3 is a flowchart of the data-migration processing of the data processing system of the present embodiment. FIG. 4 is an illustration of the workings of the data processing system of the present embodiment.

In FIG. 4, data-migration processing is executed by the data-migration program 106 of the new storage subsystem 103b, and the data stored in the old storage subsystem 103a are migrated to the new storage subsystem 103b.

First of all, the migration-control program 113 initializes the system (FIG. 4a) for data migration. To put it concretely, the migration-control program 113 pairs a logical volume 105a of the old storage subsystem 103a and a logical volume 105b of the new storage subsystem 103b. At this time, relevant host computers 101 (information about application programs, file systems, etc. which run in the relevant host computers 101) are set up, too (301. FIG. 4a).

After the initialization, the new storage subsystem 103b is connected to the SAN 102; i.e., the new storage subsystem 103b is added to the data processing system (302. FIG. 4b). At this time, though the new storage subsystem 103b is physically connected to the SAN 102, the migration-control program 113 gives the new storage subsystem 103b an instruction to refuse access from the host computers 101.

Then, route-changing processing is started (303) to shift the routes of the host computers 101 from the old storage subsystem 103a to the new one 103b. The migration-control program 113 instructs every new storage subsystem 103b under the control of the migration-control table 114 to operate as follows.

While the route-changing processing is being done, the route-changed host computer 101a accesses the new storage subsystem 103b. When the new storage subsystem 103b receives a read request from the host computer 101a, it reads the requested data from the old storage subsystem 103a and sends them to the host computer 101a. When the new storage subsystem 103b receives a write request from the host computer 101a, it writes the data to be updated in the old storage subsystem 103a (FIG. 4c).

On the other hand, the route-unchanged host computer 101b accesses the old storage subsystem 103a (FIG. 4c). The route change of host computers 101 is to change the subject of access by the host computers 101 from the old storage subsystem 103a to the new one 103b. For example, if the protocol is of a fibre channel, access information (World Wide Name or WWN) held in the host computers 101 is changed from information about the old storage subsystem 103a to information about the new one 103b. If the protocol is of iSCSI, the iSCSI name is changed from the old storage subsystem 103a to the new storage subsystem 103b. The operator of the system may change the configuration files manually for the route-changing processing. The route-changing processing can also be accomplished by making a route-control program (for example, Hitachi Dynamic Link Manager, or HDLM, or the like) in each host computer 101 and the migration-control program 113 work in cooperation with each other.

After the route-changing processing of all the host computers 101, they do not access the old storage subsystem 103a, but the new one 103b (FIG. 4d).

After the route-changing processing, data-migration processing is executed (304). The migration-control program 113 gives the new storage subsystem 103b instructions to migration the data in the old storage subsystem 103a to the new one 103b itself.

After the data-migration processing, the old storage subsystem 103a is disconnected from the SAN 102. Thus, the old storage subsystem 103a is eliminated from the data processing system (FIG. 4f). Accordingly, the data in the old storage subsystem 103a can be erased and the old storage subsystem 103a can be formatted and then loaded into another system to be used for other purposes.

During the above processing, the old and new storage subsystems 103a and 103b work differently from each other in each step in the processing. The migration-control program 113 controls the steps of the processing and gives the old and new storage subsystems 103a and 103b instructions about their workings.

FIG. 5 is a table of workings of old and new storage subsystems 103a and 103b in each phase of data-migration processing.

As shown in FIG. 5, there are four phases; i.e., a phase before route change 505, a route-changing phase 506, a data-migration phase 507, and a phase after data migration 508. The steps 301 and 302 of the flowchart of FIG. 3 correspond to the phase before route change 505; the step 303, to the route-changing phase 506; the step 304, to the data-migration phase 507; the step after the step 304, to the phase after data migration 508.

The column 501 of the table of FIG. 5 shows the numbers of phases; the column 502, reading and writing of the old storage subsystem 103a; the column 504, reading and writing of the new storage subsystem 103b.

The old storage subsystem 103a makes ordinary workings before data-migration processing (in the phase before route change 505 and the route-changing phase 506); i.e., the host computers 101 read and write data from and into the old storage subsystem 103a. After data-migration processing (in the data-migration phase 507 and the phase after data migration 508), the old storage subsystem 103a is made inaccessible from the host computers 101.

The new storage subsystem 103b is inaccessible from the host computers 101 in the phase before route change 505.

If the new storage subsystem 103b receives a write request after the route-changing phase 506 but before data-migration phase 507, it receives the data to be written and then write the data in the old storage subsystem 103a. If the new storage subsystem 103b receives a read request after the route-changing phase 506 but before data-migration phase 507, it reads data from the old storage subsystem 103a because the latest data are stored in it and then sends the requested data to the host computer 101. In other words, the new storage subsystem 103b works in response to read and write requests from the host computers 101 so that the old storage subsystem 103a will be updated.

In the data-migration phase 507, the new storage subsystem 103b migrates the data in the old storage subsystem 103a to itself. Accordingly, the data are read out of the old storage subsystem 103a in response to a request for reading data not yet migrated to the new storage subsystem 103b. The data are read out of the new storage subsystem 103b in response to a request for reading data already migrated to the new storage subsystem 103b. The data are written into the new storage subsystem 103b in response to write requests.

Because the latest data are stored in the new storage subsystem 103b in the phase after data migration 508, the host computers 101 instructs the new storage subsystem 103b to read and write data from and into the new storage subsystem 103b itself in the phase after data migration 508.

FIG. 6 is an illustration of the migration-control table 114.

The migration-control table 114 is prepared by the migration-control program 113 and stored in the migration-control host 112. The migration-control program 113 controls and implements data migration in accordance with the migration-control table 114. A unit for control called "migration group" is laid down for data-migration processing. The logical volume 105 are the minimum unit, and the optimum unit such as host computer 101, file system, application program, user, department, floor, building, or the like is adopted as the unit for control.

Each migration group is allotted a specific group ID, or identifier, 601. The migration-control program 113 controls the migration of each migration group by using the column of migration status 602. Each migration group controls the old storage subsystem 103a and the new storage subsystem 103b by using the old storage subsystem's ID 603 and the new storage subsystem's ID 604, respectively, for each volume to be migrated. The storage subsystems 103 and the logical volumes 105 in the storage subsystems 103 which each migration group belongs to can be identified based on the new storage subsystem 103b by using the old storage subsystem's ID 603 and the new storage subsystem's ID 604.

Further included in the migration-control table 114 is a detailed information column 605 which holds, for example, information about directory of each migration group. A controller of data-migration processing can easily recognize the contents of migration groups from the detailed information 605 and determine the schedule, procedure, etc. of the whole data-migration processing.

The migration-control program 113 designates the progress of data-migration processing by logical volumes based on the migration-control table 114. Besides, the migration-control program 113 designates phases (defined in FIG. 5) to the old and new storage subsystems 103a and 103b.

[Route-Changing Processing]

Figure 7:
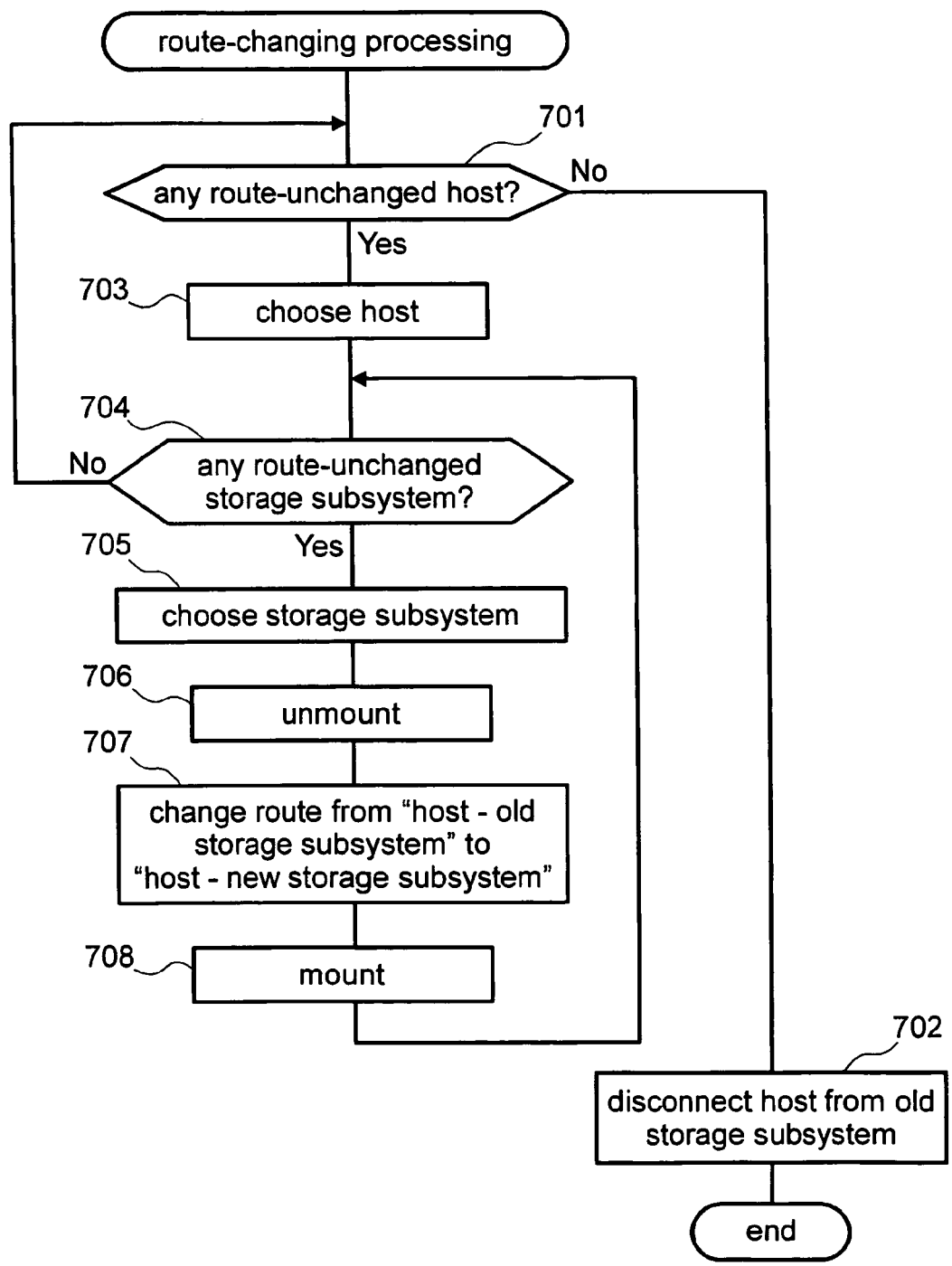
FIG. 7 is a flowchart of route-changing processing of the data processing system of FIG. 1.

FIG. 7 is a flowchart of route-changing processing (step 303 of FIG. 3).

The route-changing processing is made for each migration group. FIG. 7 shows the details of route-changing processing of a migration group. There is a pair or pairs of logical volumes 106 to be migrated for each migration group.

First of all, the migration-control program 113 ascertains whether there are route-unchanged host computers 101 or not among those belonging to the migration group to be migrated (701).

When the routes of all the host computers 101 have been changed, route-changing processing is ended and data-migration processing (step 304 of FIG. 3) is executed. The access from host computers 101 to the logical volumes 105a of the old storage subsystem 103a in the migration group is restricted. Restriction of access can be made by several methods, of which the details will be described later. At this time, a communication line between the old and new storage subsystems 103a and 103b is secured (702). Then, the migration group is advanced from the "route-changing phase" to the "data-migration phase" on the migration-control table 114.

If there are route-unchanged host computers 101, their routes are changed (706–708).

First, chosen among the route-unchanged host computers 101 is one whose route is to be changed next (703).

Then, it is ascertained whether there are route-unchanged storage subsystems 103 (704). Next, chosen regarding the chosen route-unchanged host computer 101 is a route-unchanged storage subsystem 103 which is to undergo route-changing processing (705). At this time, all the logical volumes 105 of the storage subsystem 103 relating to the host computer 101 undergo the following route-changing processing (706–708). The host computer 101 disconnects itself from the storage subsystem 103 relating to the route-changing (706). This disconnection can usually be accomplished by an unmounting function provided by the operating system of the host computer 101 or by a route control program such as HDLM or the like described earlier.

Because the new storage subsystem 103b has an identifier different from that of the old storage subsystem 103a, the host computer 101 changes set information about the storage subsystem 103 to change the route (707). If the interface is of a fibre channel or SCSI (FCP), the WWN is used as the identifier of the storage subsystem 103. If the interface is of iSCSI, the iSCSI name is used as the identifier of the storage subsystem 103. If the interface is of FICON, the WWN or port ID of the fibre channel is used as the identifier of the storage subsystem 103.

A storage subsystem 103 may have one or more identifiers, and a host computer 101 may have a plurality of identifiers against one storage subsystem 103. In this case, route-changing processing is made for only identifiers relating to the route-changing processing specified in the migration-control table 114.

After finishing the route change, the host computer 101 connects itself to the storage subsystem 103 relating to the route change (708). This connection can usually be accomplished by amounting function provided by the operating system of the host computer 101.

Thereafter, the processing of steps 704 to 708 is repeatedly executed until the route-changing processing of all the storage subsystems 103 is completed. When the route-changing processing of all the storage subsystems 103 is completed, it is again ascertained whether there are route-unchanged host computers 101 or not. Then, the processing of steps 703 to 708 is repeatedly executed until the route-changing processing of all the host computers 101 in the migration group is completed.

Although storage subsystems 103 are changed one by one in the route-changing processing described above, the route-changing processing of a plurality of storage subsystems 103 may be made at a time (704–708).

In addition, although one host computer 101 is chosen based on the migration-control table 114 and then the route-changing processing for storage subsystems 103 relating to the chosen host computer 101 is made in the route-changing processing described above, one storage subsystem 103 may first be chosen and then the route-changing processing for host computers 101 relating to the chosen storage subsystem 103 may be made.

[Data-Migration Processing]

Figure 8:
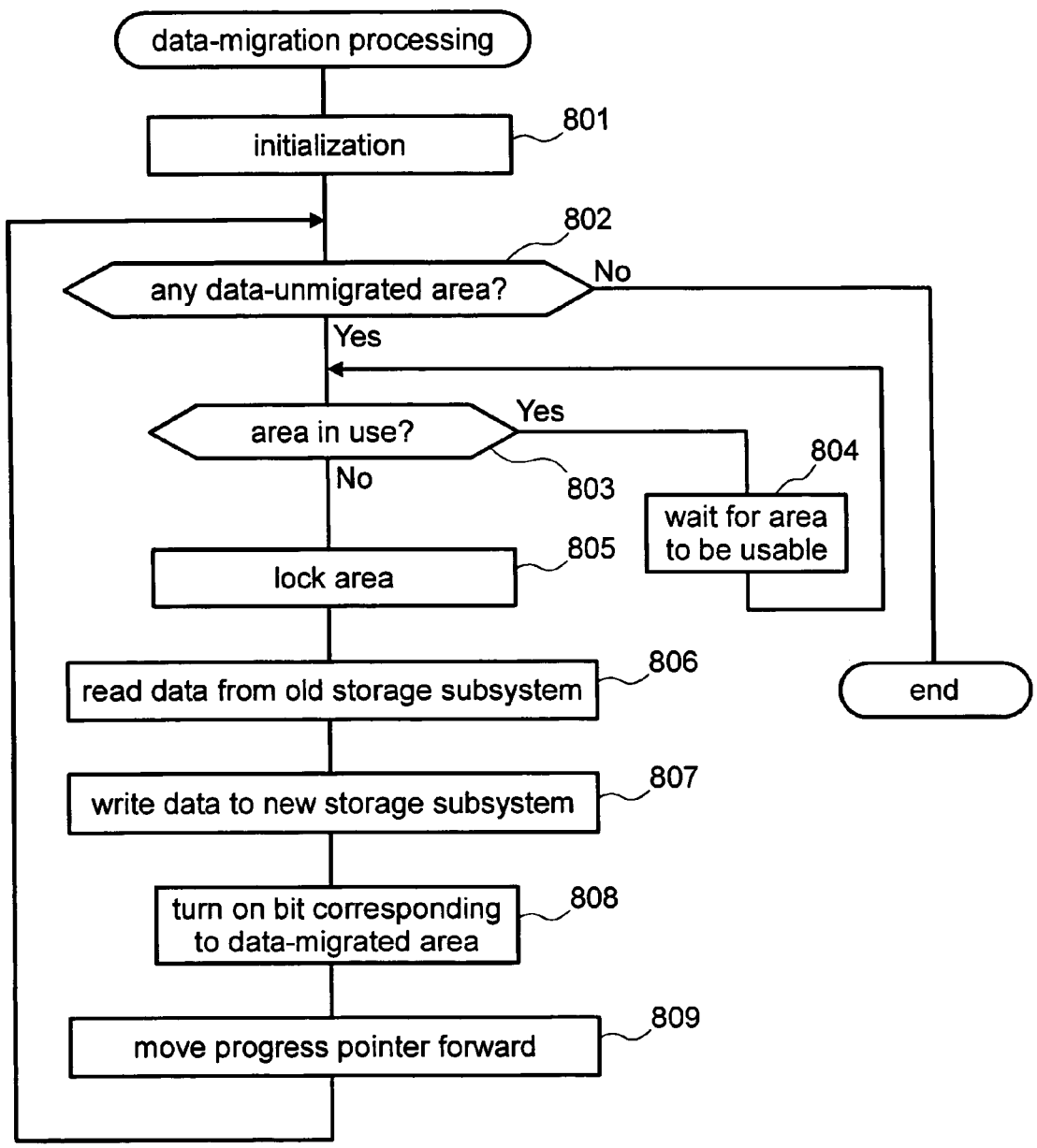
FIG. 8 is a flowchart of data-migration processing of the data processing system of FIG. 1.

FIG. 8 is a flowchart of details of data-migration processing (step 304 of FIG. 3).

Data-migration processing is executed by the data-migration program 106 of each new storage subsystem 103b. FIG. 8 shows the processing of each logical volume 105.

First of all, various variables for data-migration processing are initialized (801). Control information 108 such as a progress pointer indicating progress of migration and the phases of migration and update information 109 such as a bit map showing the state of updating are initialized as representative variables. A bit map is used to control migration areas in the data-migration processing described below.

The data-migration program 106 allots a one-bit flag to every unit for control and forms a bit map showing migration and non-migration. The size of the unit for control may be one block (512 bytes) often used by SCSI, etc. or any size (for example, one megabyte). If the bit of a unit for control is on (the value of the bit is "1"), the unit is in the latest state and data migration is unnecessary. If the bit of a unit for control is off (the value of the bit is "0"), the unit is not in the latest state and data migration is necessary. The data-migration program 106 set all the bits zero at the time of initialization and then starts data-migration processing.

The column 502 ("Status of Migration") of FIG. 5 shows the four phases of data-migration processing; i.e., a phase before route change 505, a route-changing phase 506, a data-migration phase 507, and a phase after data migration 508. The progress pointer indicates the progress of data migration and is initialized to indicate the head of the logical volume 105. Every time data are migrated, the data-migration program 106 updates the progress pointer. Usually the progress pointer indicates an address of the logical volume 105. For example, the value of the indicated address is increased by adding the number of bytes of migrated data to the progress pointer.

The data-migration program 106 of the new storage subsystem 103b refers to the progress pointer of the logical volume 105 under data migration to ascertain the progress of data migration (802). When the progress pointer indicates the end of the logical volume 105, the data migration of the logical volume 105 is complete.

The data-migration program 106 checks the condition of the area indicated by the progress pointer in order to migration the data in the area (803). If the indicated area is not used to read or write data, the data-migration program 106 locks the area (805) and advances to the next processing. If the indicated area is used to read or write data, the data-migration program 106 waits for the area to become usable (804), locks the area (805), and advances to the next processing.

The data-migration program 106 reads data from the indicated area of the old storage subsystem 103a (806), store the data in a cache memory 110, and writes the data in a disk storage 210 of the new storage subsystem 103b (807).

The data-migration program 106 updates the control information about the data migrated from the old storage subsystem 103a to the new one 103b. The data-migration program 106 turns on the bit corresponding to the area of migrated data (808) and moves the progress pointer forward by the size of the area (809).

Because mirrored cache memories 110 are usually provided and they are nonvolatile, data migrated from the old storage subsystem 103a to the new one 103b do not necessarily need to be written in the disk storage 210 as timely as described above. The data-migration program 106 may updates the progress pointer and the bit map immediately after storing migrated data in the cache memory 110 and advance to the next data-migration processing.

[Write Processing]

Figure 10:
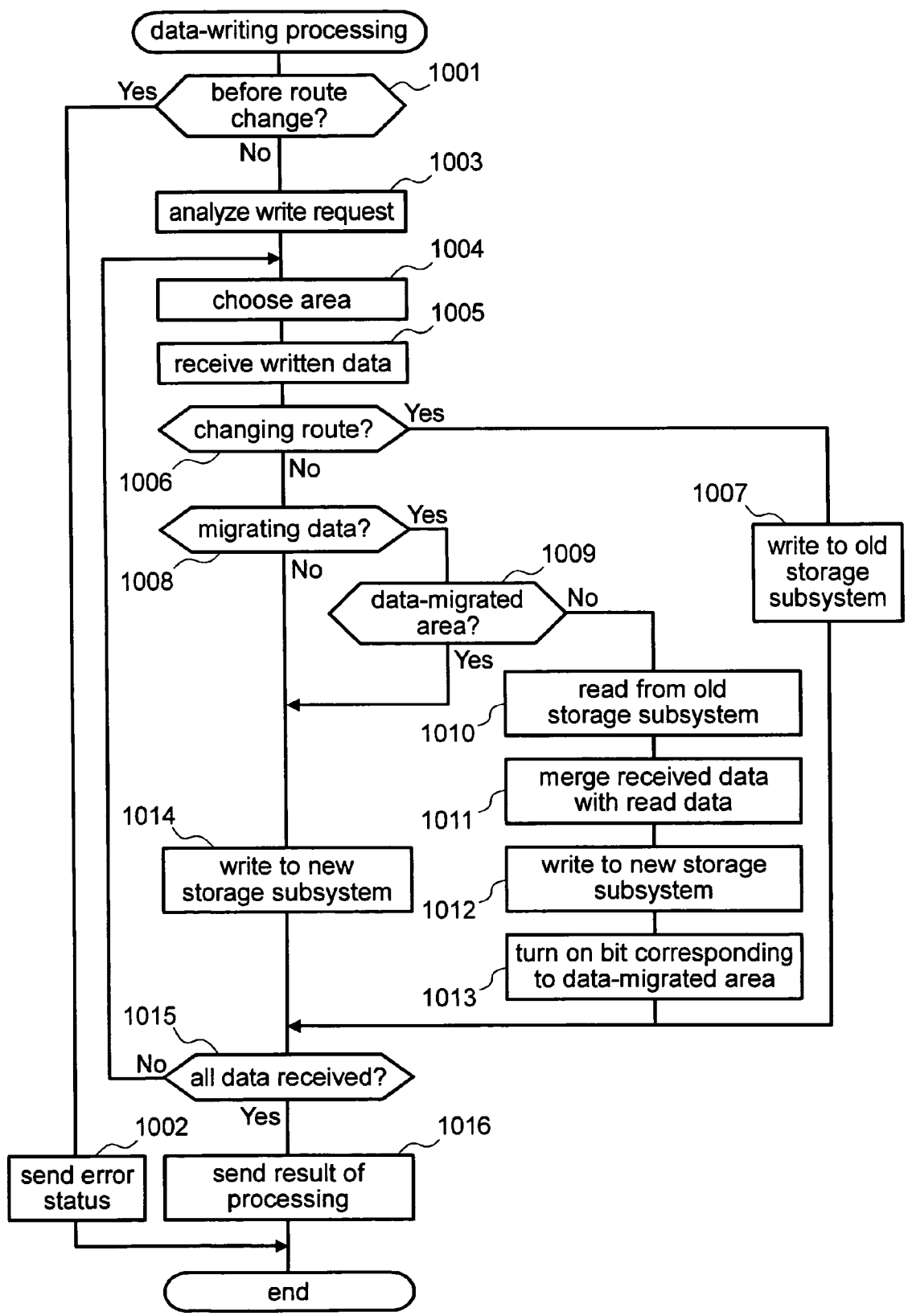
FIG. 10 is a flowchart of the data-writing processing of FIG. 9.

FIG. 9 is an illustration of data-writing processing in the route-changing phase and the data-migration phase. FIG. 10 is a flowchart of the processing.

In the route-changing phase (FIG. 9a), data 901 to be written into the new storage subsystem 103b by the host computer 101 are not written into the disk storage 210 of the new storage subsystem 103b, but the disk storage 210 of the old storage subsystem 103a. In other words, no data are written into the disk storage 210 of the new storage subsystem 103b and all data are written into the disk storage 210 of the old storage subsystem 103a in the route-changing phase.

To put it concretely, the new storage subsystem 103b receives data 901 from a host computer 101, stores the data 901 in its cache memory 110, and writes the data 901 into the disk storage 210 of the old storage subsystem 103a. Then, after writing the data 901 into the disk storage 210 of the old storage subsystem 103a, the new storage subsystem 103b returns the result 904 of the writing processing to the host computer 101. Because data-migration processing is not made in the route-changing phase, the bit map 109 is not updated (903).

In the data-migration phase (FIG. 9b), data 901 to be written into the disk storage 210 of the new storage subsystem 103b by a host computer 101 are written into the disk storage 210 of the new storage subsystem 103b.

To put it concretely, the new storage subsystem 103b receives data 901 from a host computer 101 and stores the data 901 in its cache memory 110. If data in the area which is the subject of writing have not yet been migrated, the new storage subsystem 103b migrates the data of the area.

The control unit for data migration is different from the access unit of the host computers 101 (the former is usually larger than the latter). If the area which is the subject of the writing of data 901 is smaller than the control unit for data migration, the new storage subsystem 103b reads data, whose size is equal to the control unit, relating to the area from the old storage subsystem 103a (905) and writes the data in the cache memory 110.

Then, the data read out of the old storage subsystem 103a and the data 901 received from the host computer 101 are merged together in the cache memory 110 and written into the disk storage 210 of the new storage subsystem 103b. At the same time, the corresponding bit of the bit map 109 controlling the data migration is turned on (906).

Referring to FIG. 10, the data-writing processing will be detailed.

When the data-migration program 106 of the new storage subsystem 103b receives a write request from a host computer 101, it checks the condition of data-migration processing (1001). Because the new storage subsystem 103b is inaccessible in the phase before route change 505 (see FIG. 5), an error status is returned to the host computer 101 if an access request is received from a host computer 101 in the phase before route change 505 (1002). Because the new storage subsystem 103b is accessible in the other phases, the processing is continued if an access request is received.

The data-migration program 106 of the new storage subsystem 103b analyzes the contents of the write request (1003), chooses an area corresponding to the address specified by the write requests, and locks a data-storing area in the cache memory 110 (1004). At this time, if the size of the data relating to the write request is larger than the available storage area of the cache memory 110, the processing of steps 1004 to 1014 is repeated until all the data are received (1015).

The data-migration program 106 receives the data to be written from the host computer 101 and stores the data in the area locked in the cache memory 110 (1005).

Then, the data-migration program 106 checks to see if the system is in the route-changing phase (1006) and writes the data into the old storage subsystem 103a if the system is in the route-changing phase (1007). When the writing of all the data is completed (1015), the data-migration program 106 returns the result of the processing to the host computer 101 and the writing processing comes to an end.

If the system is not in the route-changing phase 506, the data-migration program 106 checks to see if the system is in the data-migration phase 507 (1008). If the system is in the data-migration phase 507, the data-migration program 106 refers to the progress pointer and the bit map to find whether data migration has already taken place in the area relating to the writing or not (1009).

If data migration has already taken place in the area, the data-migration program 106 writes the data into the new storage subsystem 103*b* (1014). Namely, the same writing processing is made in the new storage subsystem 103*b* as in an ordinary storage subsystem. Because data migration has taken place in the whole area when data migration has been completed, data are thereafter written into the new storage subsystem 103*b*.

If migration has not yet taken place in the area relating to the writing, the data-migration program 106 reads data out of the old storage subsystem 103*a* (1010), merges the data read from the old storage subsystem 103*a* and the data 901 received from the host computer 101 together in the cache memory 110 to form data for a new area (1011). To put it concretely, the data in the corresponding area in the data read out of the old storage subsystem 103*a* are replaced by the data 901.

Then, the data-migration program 106 writes the formed data for a new area into the disk storage 210 of the new storage subsystem 103*b* (1012) and turns on the bit of the new area to indicate that data migration took place in the new area (1013).

After all the data relating to the write request undergo the above processing, the data-migration program 106 returns the result of the write request to the host computer 101 (1016).

The data writing (1007, 1012, and 1014) has to be made before the step 1016 to ensure the consistency of data. However, the data writing in the steps 1012 and 1014 may be made out of synchronism with the step 1016 because data are written into the new storage subsystem 103*b* and the cache memory 110 of the new storage subsystem 103*b* ensures the consistency of data.

Described above is a data migration method of reading data from the old storage subsystem 103*a*, merging the data thus read and the data 901 received from a host computer 101 together, and writing the added data into a disk storage 210 of the new storage subsystem 103*b*; however, data migration can be controlled by using the progress pointer alone, without using the bit map. In this case, although data to be written 901 are all written into a disk storage 210 of the new storage subsystem 103*b*, data 901 to be written into an area, where data migration has not yet taken place, with an address larger than the progress pointer are written into the old storage subsystem 103*a* too. Thereafter, the data are migrated from the old storage subsystem 103*a* to the new one 103*b* by the data-migration processing of FIG. 8.

[Read Processing]

Figure 12:
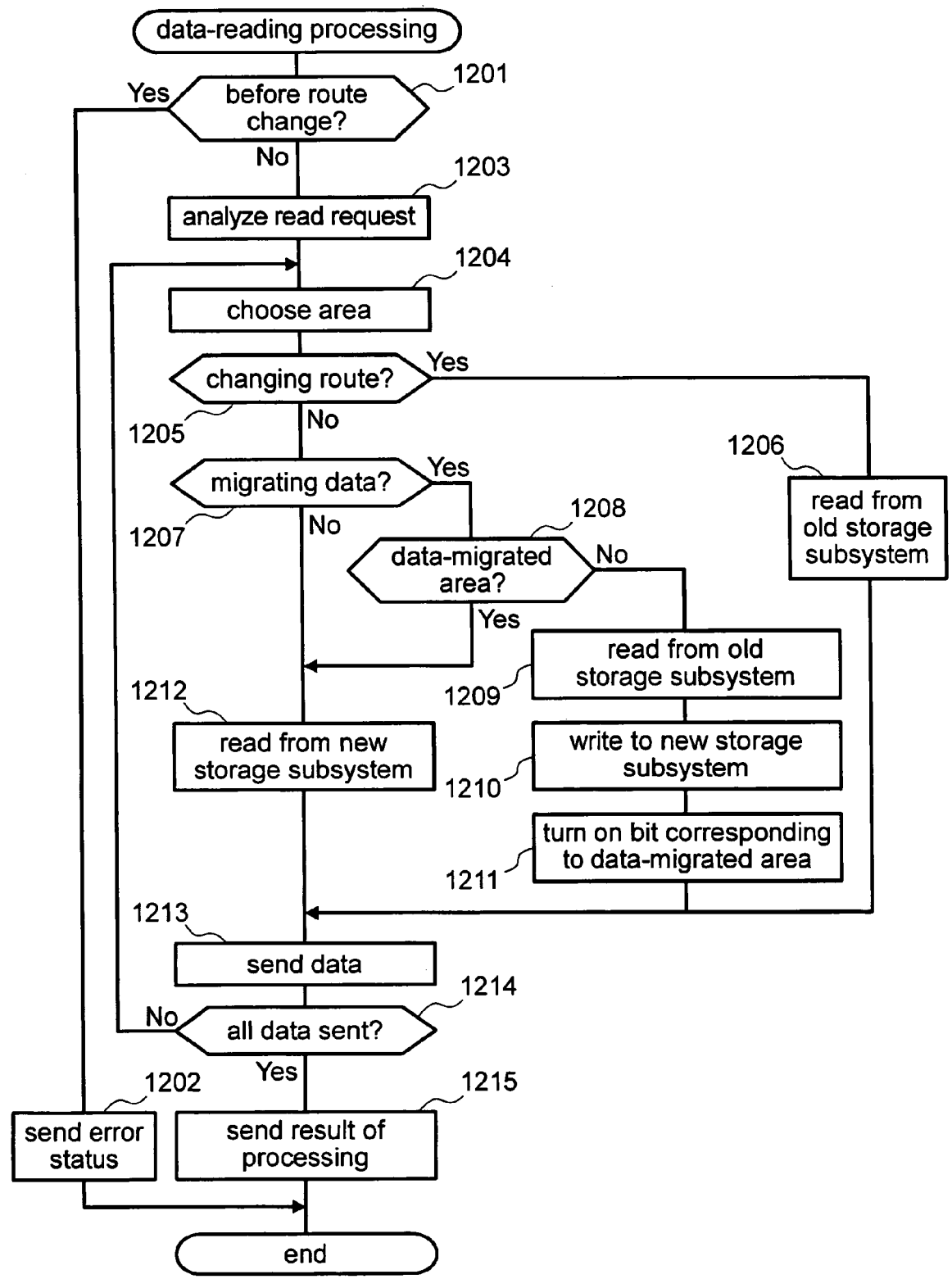
FIG. 12 is a flowchart of the data-reading processing of FIG. 11.

FIG. 11 is an illustration of data-reading processing in the route-changing phase and the data-migration phase. FIG. 12 is a flowchart of the processing.

Because the latest data from the host computers 101 are not stored in the new storage subsystem 103*b* in the route-changing phase (FIG. 11*a*), data 1201 are read out of the old storage subsystem 103*a* (1102).

To put it concretely, the new storage subsystem 103*b* reads the data 1101, which a host computer 101 required, from a disk storage 210 of the old storage subsystem 103*a* and stores the data 1101 in its cache memory 110. The new storage subsystem 103*b* sends the data 1101 to the host computer 101. After finishing the transmission of the data 1101, the new storage subsystem 103*b* sends the status 1104 to the host computer 101. In the route-changing phase, data-reading processing does not entail data migration and hence the bit map 109 is not updated.

If the data 1101 required by a host computer 101 have not yet been migrated in the data-migration phase (FIG. 11*b*), the data of the area where reading has taken place are migrated.

To put it concretely, the control unit for data migration is different from the access unit of the host computers 101 (the former is usually larger than the latter). If the area which is the subject of the reading of the required data 1101 is smaller than the control unit for data migration, the new storage subsystem 103*b* reads data, whose size is equal to the control unit, relating to the area from the old storage subsystem 103*a* (1105) and stores the read-out data in the cache memory 110.

Then, the new storage subsystem 103*b* sends the required data 1101 to the host computer 101. Thereafter, the new storage subsystem 103*b* migrates the read-out data stored in the cache memory 110 to its disk storage 210 and turns on the corresponding bit of the bit map 109 (1103).

Referring to FIG. 12, data-reading processing will be detailed below.

The data-migration program 106 of the new storage subsystem 103*b* checks the condition of data-migration processing when it receives a request from a host computer 101 (1201). Because the new storage subsystem 103*b* is inaccessible in the phase before route change 505 (see FIG. 5), an error status is returned to the host computer 101 if an access request is received from a host computer 101 in the phase before route change 505 (1202). Because the new storage subsystem 103*b* is accessible in the other phases, the processing is continued if an access request is received.

The data-migration program 106 of the new storage subsystem 103*b* analyzes the contents of the read request (1203), chooses an area corresponding to the address indicated by the write request, and locks a data-storing area in the cache memory 110 (1204). At this time, if the size of the data relating to the read request is larger than the available storage area of the cache memory 110, the processing of steps 1204 to 1213 is repeated until all the data are sent (1214).

The data-migration program 106 checks to see if the system is in the route-changing phase (1205) and read data from the old storage subsystem 103*a* if the system is in the route-changing phase (1206). When the reading of all the data is completed (1215), the data-migration program 106 returns the status to the host computer 101 (1215) and the reading processing comes to an end.

If the system is not in the route-changing phase 506, the data-migration program 106 checks to see if the system is in the data-migration phase 507 (1207). If the system is in the data-migration phase 507, the data-migration program 106 refers to the progress pointer and the bit map to find whether data migration has already taken place in the area relating to the reading or not (1208).

If data migration has already taken place in the area, the data-migration program 106 reads data from the new storage subsystem 103*b* (1014). Namely, the same reading processing is made in the new storage subsystem 103*b* as in an ordinary storage subsystem. Because data migration has taken place in the whole area when data migration has been completed, data are thereafter read from the new storage subsystem 103*b*.

If migration has not yet taken place in the area relating to the reading, the data-migration program 106 reads data out of the old storage subsystem 103*a* (1209), stores the data (hereinafter "new-area data") in the cache memory 110.

Then, data-migration program 106 writes the new-area data into a disk storage 210 of the new storage subsystem 103*b* (1210) and turns on the bit corresponding to the new area to indicate that data migration took place in the new area (1211).

The new storage subsystem 103*b* sends the data 1101 required by the host computer 101 of the new-area data to the host computer 101 (1213).

After processing all the data relating to the read request as described above, the data-migration program 106 sends the status to the host computer 101 (1215).

The writing of data (1210) during the above data-reading processing has to be made before the step 1215 to ensure the consistency of data. However, the writing may be made out of synchronism with the step 1215 because the cache memory 110 of the new storage subsystem 103*b* ensures the consistency of data.

Described above is a method of migrating the data upon a request for reading data which are not yet migrated and writing the data into a disk storage 210 of the new storage subsystem 103*b*; however, data migration can be controlled by using the progress pointer alone, without using the bit map. In this case, upon a request for reading data 1101 which are not yet migrated, the new storage subsystem 103*b* reads only the data 1101 from the old storage subsystem 103*a* and sends them to the host computer 101 without migrating them to itself. Thereafter, the data are migrated from the old storage subsystem 103*a* to the new one 103*b* by the data-migration processing shown in FIG. 8.

[Restriction of Access]

FIGS. 13 to 17 shows examples of restriction of access to the storage subsystems 103. A method of controlling access by physical connection and a method of controlling access logically are conceivable. Besides, in the case of logical restriction, access may be restricted on the side of the network or on the side of the storage subsystems 103. Embodiments of these three methods will be described below.

[Example by Wire Connection]

Figure 13:
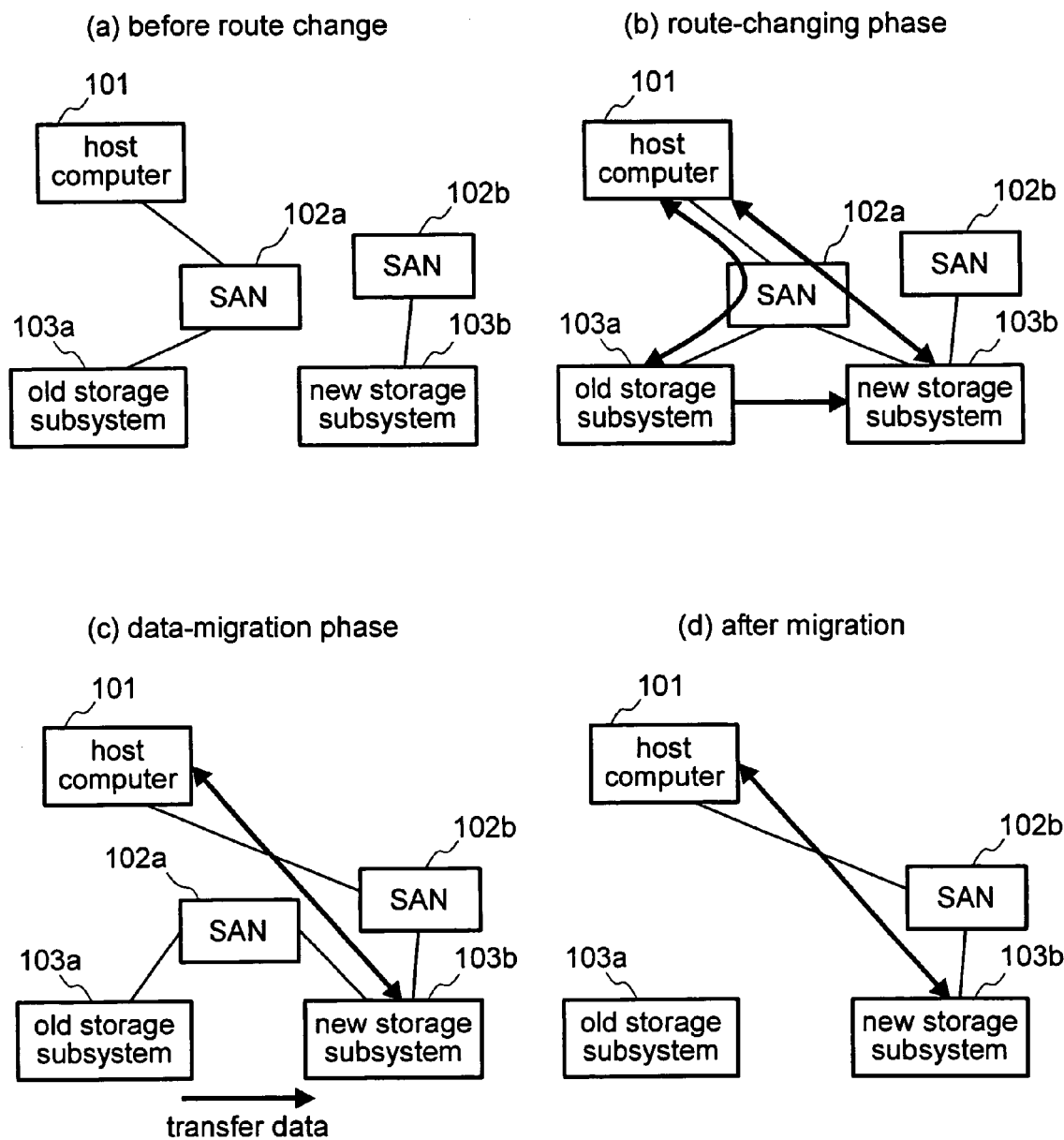
FIG. 13 is an illustration of access control by physical connection in the data processing system of FIG. 1.

FIG. 13 is an illustration of access control by physical connection.

There are a SAN 102*a* for the old storage subsystem 103*a* and a SAN 102*b* for the new storage subsystem 103*b*. As shown in FIG. 5, there are four phases in data-migration processing; i.e., a phase before route change 505, a route-changing phase 506, a data-migration phase 507, and a phase after data migration 508, which correspond to FIGS. 13*a, b, c*, and *d*, respectively.

In the phase before route change 505, the new storage subsystem 103*b* is not connected to the SAN 102*a* which is connected to the old storage subsystem 103*a*. Thus, the old and new storage subsystems 103*a* and 103*b* are physically disconnected. Besides, because the host computer 101 is not connected to the SAN 102*b* of the new storage subsystem 103*b*, the host computer 101 cannot access the new storage subsystem 103*b* (FIG. 13*a*).

In the route-changing phase 506, the new storage subsystem 103*b* is connected to the SAN 102*a* of the old storage subsystem 103*a* and the host computer 101 can access the new storage subsystem 103*b*. Thus, the route change of the host computer 101 is possible. Besides, because the old storage subsystem 103*a* is connected through the SAN 102*a* to the new storage subsystem 103*b*, the new storage subsystem 103*b* can access the old storage subsystem 103*a* for route-changing processing (FIG. 13*b*).

Upon the completion of route change of the host computer 101, the system advances into the data-migration phase 507, wherein access from the host computer 101 to the old storage subsystem 103*a* has to be prohibited. Accordingly, in the data-migration phase 507, the host computer 101 is connected to the SAN 102*b* so that the host computer 101 can access the new storage subsystem 103*b* through the SAN 102*b*. Besides, the old and new storage subsystems 103*a* and 103*b* are left connected to the SAN 102*a* in order to migrate data (FIG. 13*c*).

In the phase after data migration 508, it is no more necessary for the new storage subsystem 103*b* to access the old storage subsystem 103*a*; accordingly, the old storage subsystem 103*a* and the SAN 102*a* are disconnected from the new storage subsystem 103*b*. Because the host computer 101 is connected to the SAN 102*b*, the host computer 101 can access the new storage subsystem 103*b* through the SAN 102*b* (FIG. 13*d*).

The host computer 101 may access the new storage subsystem 103*b* directly and through no SAN 102. In this case, three lines are necessary in the route-changing phase 506; i.e., one connecting the host computer 101 and the old storage subsystem 103*a*, one connecting the host computer 101 and the new storage subsystem 103*b*, and one connecting the old and new storage subsystem 103*a* and 103*b*. Necessary in the data-migration phase 507 are dual lines, one connecting the old storage subsystem 103*a* to the new one 103*b* and the other connecting the host computer 101 to the new storage subsystem 103*b*.

If no SAN 102 is used, the connectibility of the new storage subsystem 103*b* is reduced; therefore, it is preferable to use SANs 102 when a large-scale data processing system with many host computers 101 and storage subsystems 103 is to be configured.

[Example by Zoning]

Figure 14:
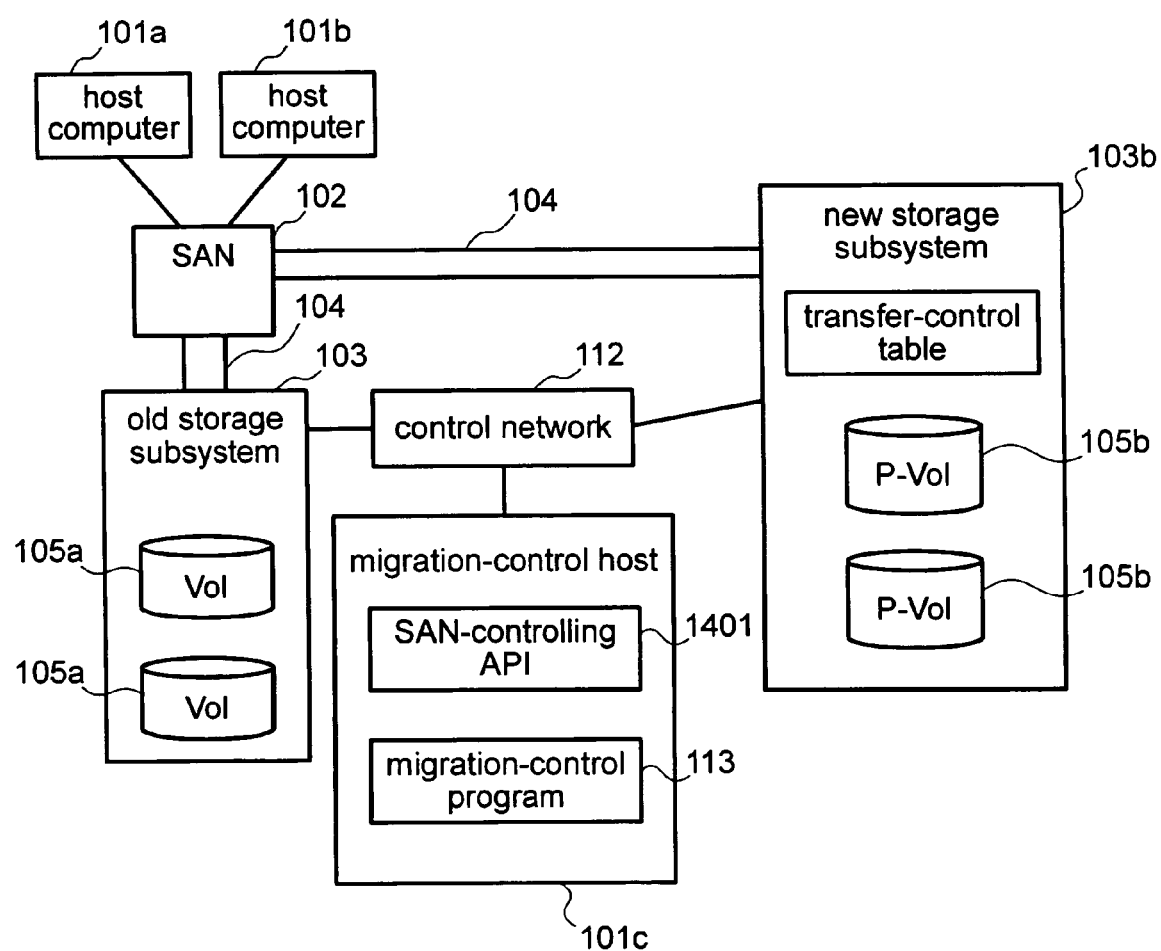
FIG. 14 is a block diagram of the data processing system of FIG. 1 where restriction is imposed on access by zoning.

FIG. 14 is a block diagram of the data processing system where restriction is imposed on access by zoning.

The migration control host 112 of the data processing system is provided with a SAN-controlling API (Application Program Interface) 1401 for the control of the network. The migration control program 113 imposes restriction on access in the SAN 102 in each phase by using the SAN-controlling API 1401. Because the configuration of this data processing system, except the SAN-controlling API 1401, is the same as the configuration of the data processing system of FIG. 1, detailed description is omitted here.

Figure 15:
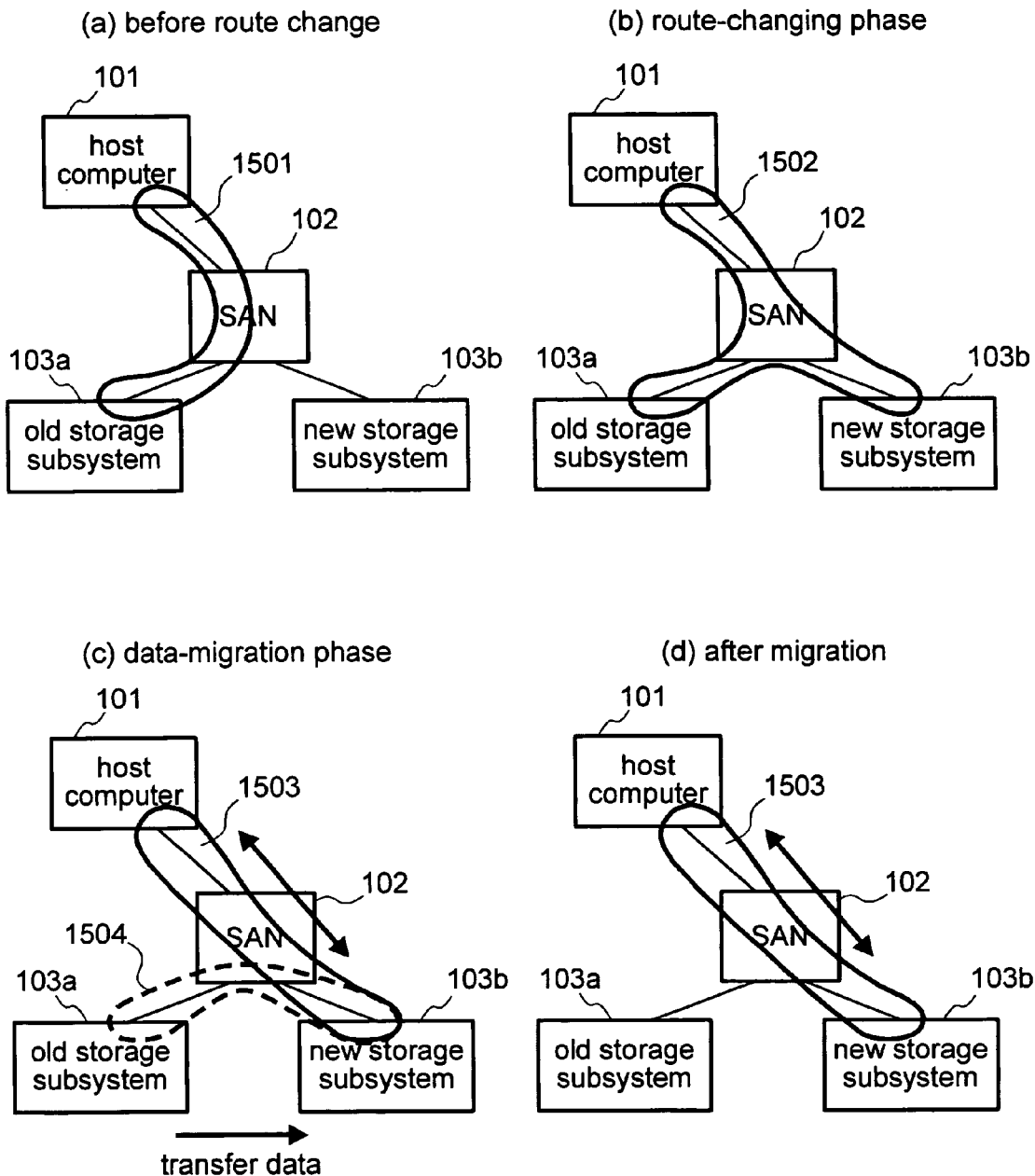
FIG. 15 is an illustration of access restriction of FIG. 14.

FIG. 15 is an illustration of restriction of access of the data processing system by zoning.

Zoning means to divide ports of fibre channels into groups (zones) by using their ID numbers (World Wide Names or WWNs). Which host computer 101 is accessing which storage subsystem 103 is identified by using fibre channel switches configuring the SAN 102, and switches are turned on and off to prohibit access to another zone or from another zone. The phase before route change 505, route-changing phase 506, data-migration phase 507, and phase after data migration 508 of data migration shown in FIG. 5 correspond to FIGS. 15*a, b, c*, and *d*, respectively.

The host computer 100, the old storage subsystem 103*a*, and the new storage subsystem 103*b* are connected to the SAN 102.

Formed in the phase before route change 505 is a zone 1501 which includes the host computer 101 and the old storage subsystem 103*a* and excludes the new storage subsystem 103*b*; accordingly, the host computer 101 cannot access the new storage subsystem 103*b* (FIG. 15*a*).

Formed in the route-changing phase 506 is a zone 1502 which includes the host computer 101 and the old and new storage subsystems 103a and 103b; accordingly, the host computer 101 can access both the old and new storage subsystem 103a and 103b, and hence the route change of the host computer 101 is possible (FIG. 15b).

When the route change of the host computer 101 is completed, the system advances into the data-migration phase 507, wherein access to the old storage subsystem 103a has to be prohibited. Accordingly, formed in the data-migration phase 507 is a zone 1503 which includes the host computer 101 and the new storage subsystem 103b and excludes the old storage subsystem 103a. In addition, a zone 1504 is formed to include the old and new storage subsystems 103a and 103b. The zone 1503 enables the host computer 101 to access the new storage subsystem 103b, and the zone 1504 enables the migration of data from the old storage subsystem 103a to the new one 103b (FIG. 15c).

In the phase after data migration 508, the zone 1504 is eliminated because access from the new storage subsystem 103b to the old one 103a is unnecessary. The zone 1503 alone is left and is continued to be used for access from the host computer 101 to the new storage subsystem 103b (FIG. 15d).

In the same way, restriction can be imposed on access by using a VLAN in Ethernet (a registered trademark).

[Example by Storage Subsystems]

The storage subsystem 103 is usually provided with a function of restricting access to its volumes 105 called "LU security" (hereinafter "storage security function"). In the embodiment described below, access control during data migration processing is accomplished by using the storage security function.

Figure 16:
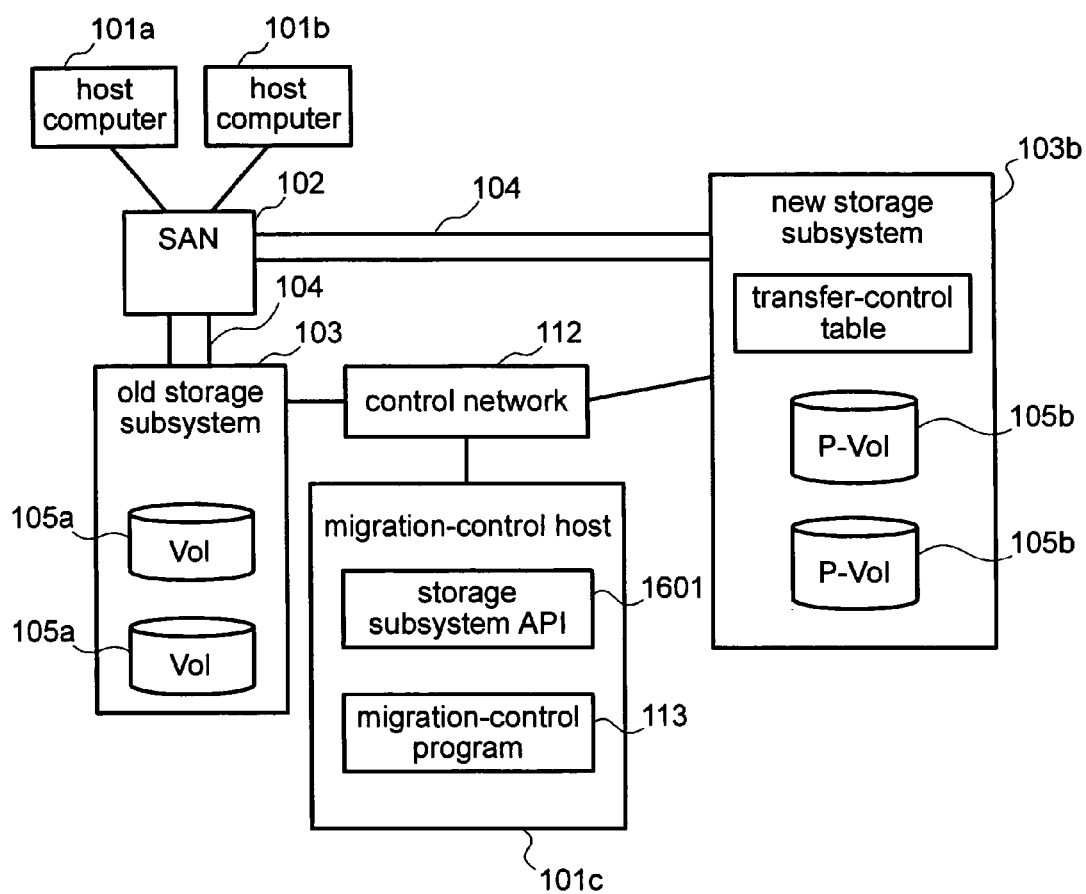
FIG. 16 is a block diagram of the data processing system of FIG. 1 wherein access control is accomplished by the storage security function.

FIG. 16 is a block diagram of the data processing system wherein access control is accomplished by the storage security function. The migration control host 112 of the data processing system is provided with a storage subsystem-controlling API (Application Program Interface) 1601 for the control of the network. The migration control program 113 imposes restriction on access in the SAN 102 in each phase by using the storage subsystem-controlling API 1601. For the access restriction, various identifiers can be used such as identifiers logically allotted to the host computers (identifiers used on the networks including the IP address), identifiers physically allotted to network interfaces (for example, the MAC address of Ethernet, the WWN of the fibre channel, etc.), and identifiers logically allotted to network interfaces (for example, the iSCSI Name). Because the configuration of this data processing system, except the storage subsystem-controlling API 1601, is the same as the configuration of the data processing system of FIG. 1, detailed description is omitted here.

Figure 17:
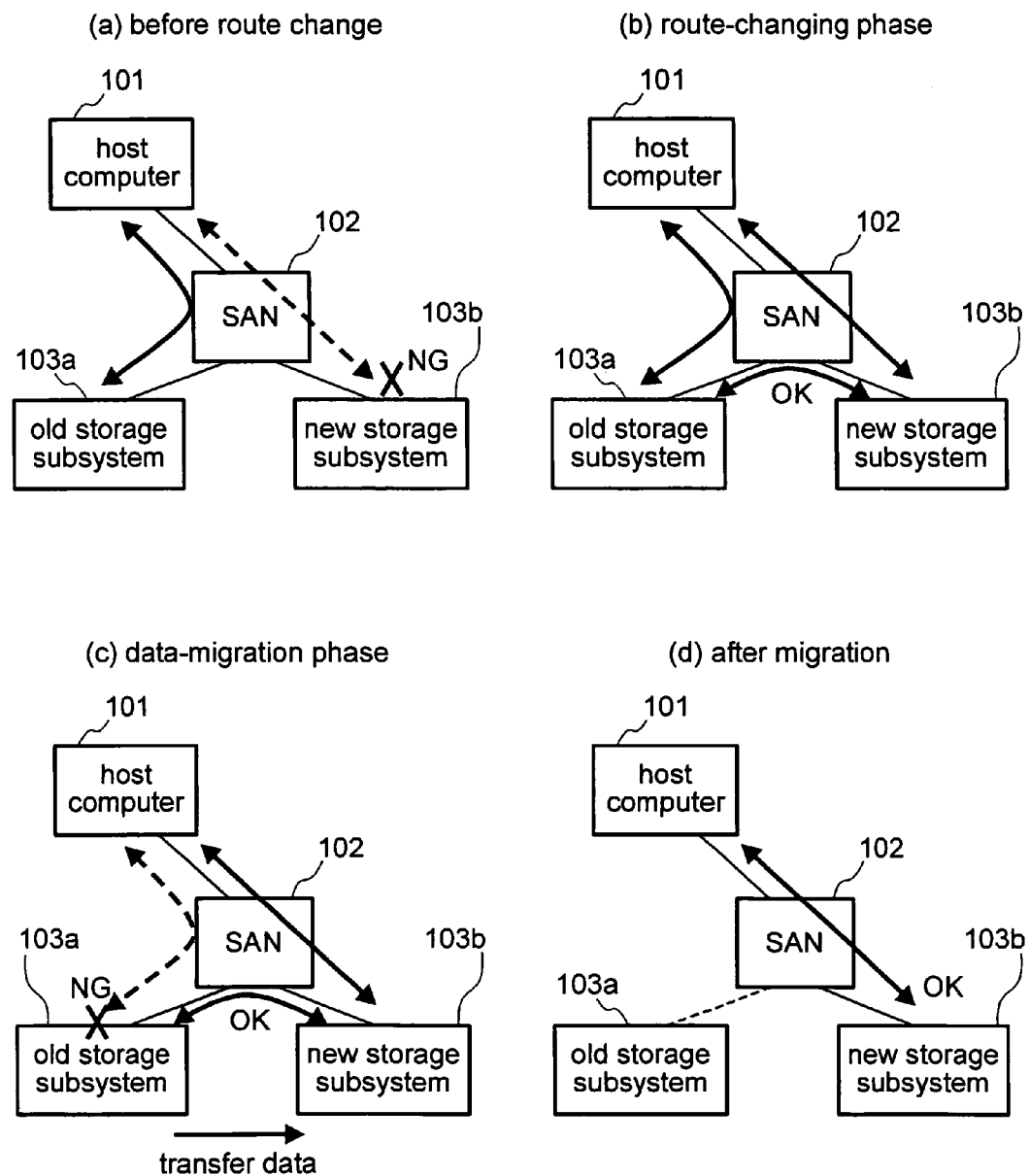
FIG. 17 is an illustration of the access control of FIG. 16.

FIG. 17 is an illustration of restriction of access of the data processing system by the storage security function.

The phase before route change 505, route-changing phase 506, data-migration phase 507, and phase after data migration 508 of data migration shown in FIG. 5 correspond to FIGS. 17a, b, c, and d, respectively.

The host computer 101, the old storage subsystem 103a, and the new storage subsystem 103b are connected to the SAN 102.

In the phase before route change 505, the migration-control program 113 sets such that the host computer 101 can access the old storage subsystem 103a and external devices cannot access the new storage subsystem 103b (FIG. 17a).

In the route-changing phase 506, the migration-control program 113 sets such that the host computer 101 can access both the old storage subsystem 103a and new storage subsystem 103b. Since the new storage subsystem 103b has to access the old storage subsystem 103 during the route change, the migration-control program 113 sets such that the new storage subsystem 103 can also access the old storage subsystem 103a (FIG. 17b).

When the route change of the host computer 101 is completed, the system advances into the data-migration phase 507, wherein access to the old storage subsystem 103a has to be prohibited. Accordingly, in the data-migration phase 507, the migration control program 113 sets such that the host computer 101 cannot access the old storage subsystem 103a and the new storage subsystem 103b can access the old storage subsystem 103a. The migration of data is executed by the access of the new storage subsystem 103b to the old storage subsystem 103a. As in the route-changing phase 506, the new storage subsystem 103b is made to be accessible from the host computer 101 (FIG. 17c).

In the phase after data migration 508, it is no more necessary for the new storage subsystem 103b to access the old storage subsystem 103a; accordingly, the migration-control program 113 prohibits all the access to the old storage subsystem 103a. Further, the migration-control program 113 keeps the new storage subsystem 103b to be accessible from the host computer 101 (FIG. 17d).

[Combination]

Referring to FIGS. 13 through 17, embodiments in which access restriction can be accomplished in the network 102 and storage subsystem 103 have been described. However, by combining the access restriction on the side of the network and on the side of the storage subsystem 103, stronger restriction of access can be accomplished.

[Data Migration with a Debugging Mode]

In the route-changing processing, it is necessary to ascertain setting of a new route. Therefore, a debugging mode may be provided in the route-changing processing (303 of FIG. 3). In this case, route changes with respect to all the host computers 101 must be executed at the same time.

Figure 18:
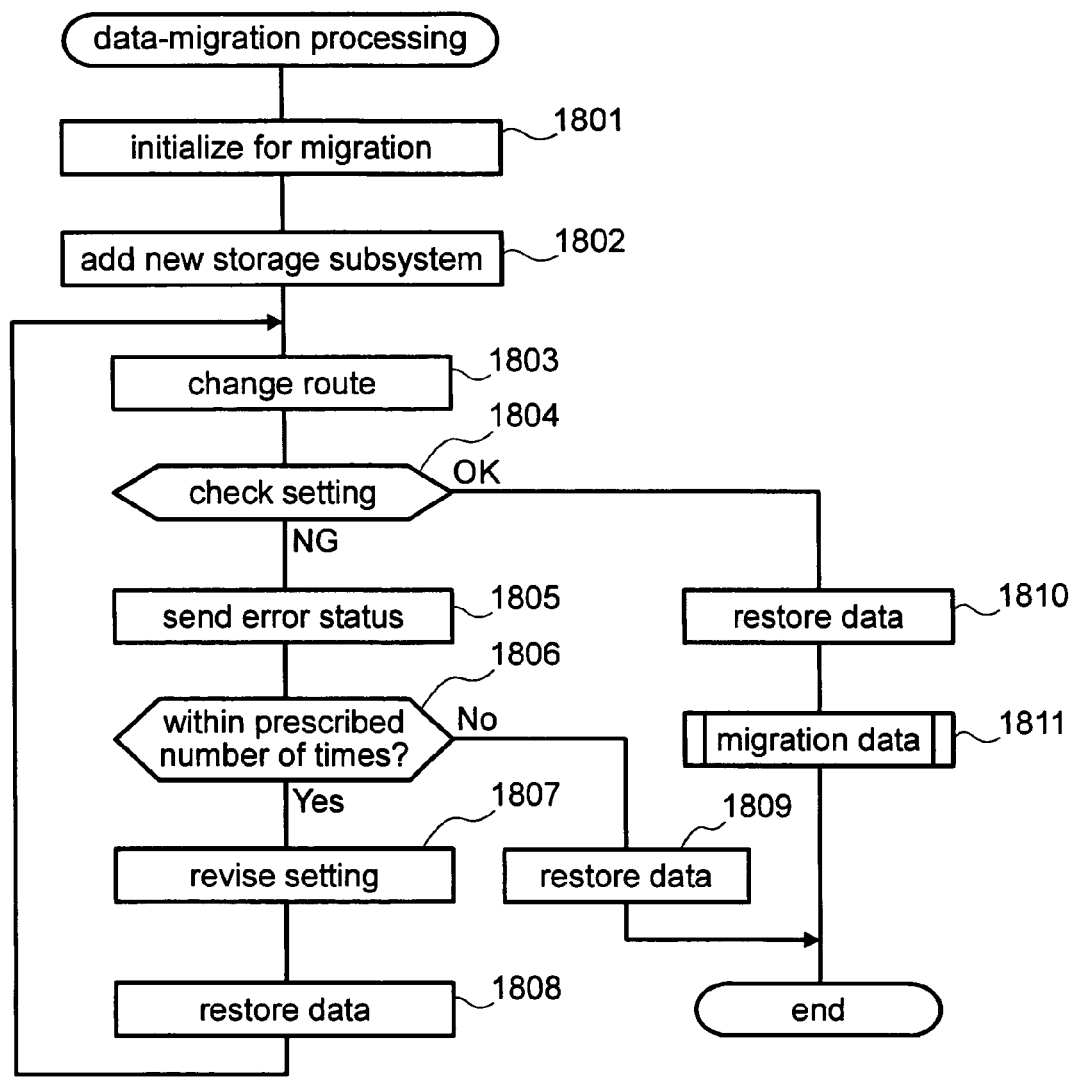
FIG. 18 is a flowchart of data-migration processing with a debugging mode of the data processing system of FIG. 1.

FIG. 18 is a flowchart of data-migration processing with a debugging mode of the data processing system of FIG. 1.

As in the previously described initialization of FIG. 3 (301), in the phase before migration, the migration-control program 113 initializes the system for data migration (1801).

After the initialization, as in the processing of FIG. 3 (302), the new storage subsystem 103b is added to the data processing system (1802).

Then, new routes are provided to all the host computers 101 related to the data migration (1803). At the same time, the debugging mode of the new storage subsystem 103b is turned on.

In the debugging mode, access to the old storage subsystem 103a is prohibited. The new storage subsystem 103b stores the data written by the host computer 101 in itself. With respect to the written data, information of the update data is stored in the bit-map format.

In response to a read request from the host computer 101, the new storage subsystem 103b refers to the bit map for update information. When the data are written in the new storage subsystem 103b, such data are read from the new storage subsystem 103b. On the other hand, when there is no written data in the new storage subsystem 103b, data are read from the old storage subsystem 103a and sent to the host computer 101.

Then, the route is checked by executing a test program in the host computer 101 to see if the newly set route is correct or not (1804).

If the route is not correctly set, when the test program tries to access the old storage subsystem 103a while the test program is running, there occurs an error because the old storage subsystem 103a is inaccessible (1805). Then, it is checked whether the number of errors is within the prescribed number or not. (1806). An upper limit to the number of errors is set in advance. If the number of errors is within the prescribed number, the setting is revised (1807) and data are restored (1808). Then, the process returns to the step 1803 and the test program is executed again.

On the other hand, when the number of errors exceeds the prescribed number, the new storage subsystem 103b discards the written data, and executes data-restoring processing, which returns the data to a state when the new storage subsystem was added (phase before route change)(1809). The data-restoring processing may be executed by deleting the data written in the new storage subsystem 103b. However, it can be accomplished by deleting all the update information recorded in the bit-map format. Then, the data-migration processing is completed.

Further, when it is ascertained that the test program is normally finished and the route is correctly set, the data-restoring processing is executed in which the data are returned to the state before the route change (1810). Then, the data-migration processing is executed (1811). In the data-migration processing (1811), the same processing as in the data-migration processing (304) of FIG. 3 is executed.

During the migration processing (the steps 1803 through 1811), the new storage subsystem 103b can access the old storage subsystem 103a and the host computer 101 can access the new storage subsystem 103b.

FIG. 19 shows workings of the old storage subsystem 103a and the new storage subsystem 103b in each phase of the data-migration processing with a debugging mode (FIG. 18).

In the debugging phase (1906), the host computer 101 can't access the old storage subsystem 103a. With respect to reading from the new storage subsystem 103b, non-updated data are read from the old storage subsystem 103a and updated data are read from the new storage subsystem 103b to be sent to the host computer 101, which conducts reading. With respect to data-writing processing by the host computer 101, all the data are stored in the new storage subsystem 103b.

Further, since each of the phase before route change, data-migration phase and phase after data migration is the same as the one in FIG. 5, the description for it is omitted.

As described above, according to the embodiments of the present invention, the route-changing phase is provided before the data migration, and access from the host computer is made possible even during the route-changing phase, which enhances the system availability during the data migration.

To put it concretely, data migration is executed for every volume, the route-changing phase is provided, and routes of host computers related to the volumes whose routes are being changed are sequentially switched. While a plurality of host computers are accessing the volumes whose route changes are in progress, the host computer before the route change accesses the old storage subsystem, and the host computer after the route change accesses the new storage subsystem. To ensure the consistency of data in the old storage subsystem and the new storage subsystem, all the update information is to be reflected in the old storage subsystem. The host computer before the route change writes and reads data to and from the old storage subsystem. Further, with respect to the access from the host computer after the route change to the new storage subsystem, during the data-reading processing, the data read by the new storage subsystem from the old storage subsystem are sent to the host computer. During the data-writing processing, data are written into the new storage subsystem.

In this way, even during the route-changing phase, it is made possible for both the access from the route-unchanged host computer to the old storage subsystem and from the route-changed host computer to the new storage subsystem to be achieved at the same time. Further, in the route-changing phase, the latest data are stored in the old storage subsystem and the consistency of data between the old storage subsystem and the new storage subsystem is ensured, enhancing the availability of the system in the data-migration processing.

The function according to the present invention can also be accomplished by the new storage subsystem alone, and there is no need to add new functions to the old storage subsystem.

What is claimed is:

1. A method of migrating data from an old storage subsystem to a new storage subsystem in a data processing system which includes a plurality of host computers and a plurality of storage subsystems said method comprising the steps of:

conducting a route-changing phase before migration of the data from the old storage subsystem to the new storage subsystem;

in said route-changing phase, sequentially changing an indication of access destination storage subsystems in said host computers such that an indication of the access destination storage subsystem of a first host computer is changed from said old storage subsystem to said new storage subsystem, an indication of the access destination storage subsystem of a second host computer is unchanged from said old storage subsystem to said new storage subsystem, and then an indication of the access destination storage subsystem of the second host computer is changed from said old storage subsystem to said new storage subsystem after the access destination storage subsystem of the first host computer has been changed, thereby permitting each host computer to access both the old and new storage subsystems; and in said route changing phase, by said new storage subsystem, reading data from said old storage subsystem in response to a read request from a said first host computer, sending the data to said first host computer, and writing data into said old storage subsystem in response to a write request from said first host computer.

2. A method of migrating data according to claim 1, further comprising the step of:

by said new storage subsystem, writing data into said old storage subsystem in response to a write request from said host computer in said route-changing phase and informing said host computer of completion of said writing after ascertaining data writing processing has been completed.

3. A method of migrating data according to claim 1, wherein said new storage subsystem writing data into said old storage subsystem in response to a write request from said host computer and informing said host computer write processing has been completed.

4. The method of migrating data according to claim 1, wherein a phase is provided before said route-changing phase in which a route is set such that access from said host computer to said new storage subsystem is prohibited and access from said host computer to said old storage subsystem is allowed.

5. A method of migrating data according to claim 1, wherein a data-migration phase is provided after said route-changing phase in which a route is set such that access from said host computer to said old storage subsystem is prohibited and access to said new storage subsystem is allowed.

6. A method of migrating data according to claim 1, wherein, in a data-migration phase, said new storage subsystem reads data from said new storage subsystem and sends the data to said host computer when the read request from said host computer is directed to a data-migration area, and
wherein said new storage subsystem reads data from said old storage subsystem and sends the data to said host computer when the read request from said host computer is directed to a data-unmigrated area.

7. A method of migrating data according to claim 1, wherein a route is set such that access from said host computer to said old storage subsystem is prohibited and access to said new storage subsystem is allowed even after completion of a data-migration phase.

8. A method of migrating data according to claim 1, wherein an access route to said new storage subsystem is set by at least one of a plurality of method of changing a form of connection among said host computer, said old storage subsystem and said new storage subsystem,
wherein said method further comprises:
using access restriction by a network connecting said host computer, said old storage subsystem and said new storage subsystem, and
using access restriction by said storage subsystem.

9. A method of migrating data according to claim 1, wherein a route verification process is performed by which a route set in said route-changing phase is determined to be correct or not before migrating the data from said old storage subsystem to said new storage subsystem.

10. A method of migrating data according to claim 9, wherein a route is set such that access from said host computer to said old storage subsystem is prohibited and access to said new storage subsystem is allowed during said route verification process,
wherein said new storage subsystem writes data requested by said host computer to said new storage subsystem and stores written data,
wherein said new storage subsystem, in response to a read request from said host computer, refers to said written data and checks to see if the data stored in said new storage subsystem during said route verification process are updated,
wherein when the data stored in said new storage subsystem are updated during said route verification process, the data are read from said new storage subsystem and sent to said host computer, and
wherein, when the data stored in said new storage subsystem are not updated during said route verification, the data are read from said old storage subsystem and sent to said host computer.

11. A method of migrating data according to claim 9, wherein data updated during said route verification process are discarded when the set route is determined to be incorrect and a state is returned to a state before route change.

12. A method of migrating data according to claim 9, wherein data updated during said route verification process are discarded when the set route is determined to be correct, and data-migration processing is executed after returning to a state before route change.

13. A method of migrating data from an old storage subsystem to a new storage subsystem in a data processing system which includes a plurality of host computers and a plurality of storage subsystems connected to said plurality of host computers, said method comprising the steps of:
conducting a route-changing phase before migration of the data from the old storage subsystem to the new storage subsystem;
in said route-changing phase, sequentially changing an indication of access destination storage subsystems in said host computers such that an indication of the access destination storage subsystem of a first host computer is changed from said old storage subsystem to said new storage subsystem, an indication of the access destination storage subsystem of a second host computer is unchanged from said old storage subsystem to said new storage subsystem, and then an indication of the access destination storage subsystem of the second host computer is changed from said old storage subsystem to said new storage subsystem after the access destination storage subsystem of the first host computer has been changed, thereby permitting said host computers to include route-changed host computers accessing said new storage subsystem and route-unchanged host computers accessing said old storage subsystem,
in said route changing phase, by said new storage subsystem, reading data from said old storage subsystem in response to a read request from a route-changed host computer and sending the data to said route-changed host computer,
in said route changing phase, by said new storage subsystem, writing data into said old storage subsystem in response to a write request from said route-changed host computer and informing said route changed host computer of completion of processing after ascertaining completion of data-writing processing,
in said route changing phase, by said old storage subsystem, reading data and sending the data to a route changed host computer in response to a read request from said route-unchanged host computer, and
in said route changing phase, by said old storage subsystem, writing data in response to a write request from said route-unchanged host computer and informing said route-changed host computer of completion of processing after ascertaining completion of data-writing processing.

* * * * *